US009004534B2

United States Patent
Minamigata et al.

(10) Patent No.: US 9,004,534 B2
(45) Date of Patent: *Apr. 14, 2015

(54) STEERING APPARATUS FOR AN AUTOMOBILE

(75) Inventors: Takahiro Minamigata, Gunma (JP); Minao Umeda, Gunma (JP); Takeshi Fujiwara, Gunma (JP); Osamu Tatewaki, Gunma (JP); Kiyoshi Sadakata, Gunma (JP)

(73) Assignee: NSK Ltd. (JP)

( * ) Notice: Subject to any disclaimer, the term of this patent is extended or adjusted under 35 U.S.C. 154(b) by 441 days.

This patent is subject to a terminal disclaimer.

(21) Appl. No.: 13/379,480

(22) PCT Filed: Sep. 7, 2011

(86) PCT No.: PCT/JP2011/070347
§ 371 (c)(1), (2), (4) Date: Dec. 20, 2011

(87) PCT Pub. No.: WO2012/049920
PCT Pub. Date: Apr. 19, 2012

(65) Prior Publication Data
US 2012/0186384 A1    Jul. 26, 2012

(30) Foreign Application Priority Data

Oct. 15, 2010 (JP) .................. 2010-232446
Oct. 21, 2010 (JP) .................. 2010-236760
Oct. 27, 2010 (JP) .................. 2010-241109

(51) Int. Cl.
*B62D 1/00* (2006.01)
*B62D 1/19* (2006.01)

(52) U.S. Cl.
CPC ..................... *B62D 1/195* (2013.01)

(58) Field of Classification Search
USPC ................... 74/492, 493; 280/775, 777, 779
See application file for complete search history.

(56) References Cited

U.S. PATENT DOCUMENTS 7,651,132 B2 * 1/2010 Cho et al. .................. 280/777
7,665,767 B2 * 2/2010 Olgren et al. ............... 280/777
(Continued)

FOREIGN PATENT DOCUMENTS

| JP | 5138841 | 3/1976 |
| JP | 49111334 | 3/1976 |
| JP | 5039321 | 9/1976 |
| JP | 51119231 | 9/1976 |

(Continued)

*Primary Examiner* — William Kelleher
*Assistant Examiner* — Thomas Magnuson
(74) *Attorney, Agent, or Firm* — Hartman Global IP Law; Gary M. Hartman; Michael D. Winter

(57) ABSTRACT

Provided is construction of a steering apparatus for an automobile that is capable of simplifying tuning for stabilizing forward displacement in the forward direction of a steering wheel during a secondary collision, and preventing damage to the component members of the section that supports a bracket 12b on the column side with respect to the bracket 11 on the vehicle side. In construction where the bracket on the vehicle side 11 and the bracket 12b on the column side are connected at only one location in the center section in the width direction of the both brackets by a locking capsule, the top edges of a pair of protruding sections 63 that protrude to both the left and right sides of the bracket 12b on the column side closely face the bottom edge of a bent section 56 of the bracket 11 on the vehicle side. The bracket 12b on the column side is prevented from inclining excessively even when a large moment is applied to the bracket 12b on the column side when an attempt is made to rotate the steering wheel with a steering lock apparatus in the locked state.

8 Claims, 15 Drawing Sheets

(56) References Cited

U.S. PATENT DOCUMENTS

| | | | |
|---|---|---|---|
| 7,707,908 B2 * | 5/2010 | Tanaka et al. | 74/493 |
| 8,523,228 B2 * | 9/2013 | Minamigata et al. | 280/777 |
| 8,544,887 B2 * | 10/2013 | Fujiwara et al. | 280/777 |
| 8,585,089 B2 * | 11/2013 | Minamigata et al. | 280/777 |
| 8,733,793 B2 * | 5/2014 | Minamigata et al. | 280/777 |
| 2006/0181070 A1 * | 8/2006 | Imamura et al. | 280/777 |
| 2007/0068311 A1 | 3/2007 | Shimoda et al. | |
| 2008/0284150 A1 * | 11/2008 | Yamada | 280/777 |
| 2011/0036198 A1 | 2/2011 | Minamigata | |
| 2012/0186384 A1 * | 7/2012 | Minamigata et al. | 74/492 |

FOREIGN PATENT DOCUMENTS

| | | |
|---|---|---|
| JP | 51121929 | 10/1976 |
| JP | 5241820 | 3/1977 |
| JP | 50128517 | 3/1977 |
| JP | 1086792 | 3/1989 |
| JP | 341972 | 9/1991 |
| JP | 11245826 | 9/1999 |
| JP | 20006821 | 1/2000 |
| JP | 2005219641 | 8/2005 |
| JP | 200769821 | 3/2007 |
| JP | 2009196562 | 9/2009 |

* cited by examiner

STEERING APPARATUS FOR AN AUTOMOBILE

TECHNICAL FIELD

The present invention relates to a steering apparatus for an automobile that applies an angle to the front wheel according to the operation of a steering wheel, and more particularly to an impact absorbing steering apparatus that enables forward displacement of the steering wheel while absorbing impact energy that is applied to the steering wheel from the body of the driver during a collision accident.

BACKGROUND ART

A steering apparatus for an automobile, as illustrated in FIG. 12, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. In order to accomplish this, the steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9. The intermediate shaft 8 is constructed so that the shaft can transmit torque, and can contract along its entire length due to an impact load, so that when the steering gear unit 2 is displaced in the backward direction due to a primary collision between an automobile and another automobile, that displacement is absorbed, which prevents the steering wheel 1 from displacing in the backward direction via the steering shaft 5 and hitting the body of the driver.

In order to protect the body of the driver, this kind of steering apparatus for an automobile requires construction that allows the steering wheel to displace in the forward direction while absorbing impact energy during a collision accident. In other words, after the primary collision in a collision accident, a secondary collision occurs when the body of the driver collides with the steering wheel 1. In order to protect the driver by lessening the impact applied to the body of the driver during this secondary collision, construction is known (refer to JP51-121929(U) and JP2005-219641) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6.

FIG. 13 to FIG. 15 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 12) can be fastened to the portion on the rear end section of this steering shaft 5a that protrudes from the opening on the rear end of the steering column 6a. The steering column 6a and the housing 10 are supported by a fastening bracket 11 on the vehicle side (see FIG. 1 to FIG. 5) that is fastened to the vehicle body so that they can break away in the forward direction due to an impact load in the forward direction.

To accomplish this, a bracket 12 on the column side that is supported in the middle section of the steering column 6a and a bracket 13 on the housing side that is supported by the housing 10 are supported with respect to the vehicle body so that they both can break away in the forward direction due to an impact load in the forward direction. These brackets 12, 13 both comprise installation plate sections 14a, 14b at one to two locations, and cutout sections 15a, 15b are formed in these installation plate sections 14a, 14b so that they are open on the rear end edges. With these cutout sections 15a, 15b covered, sliding plates 16a, 16b are assembled in the portions of these brackets 12, 13 near both the left and right ends.

These sliding plates 16a, 16b are formed by bending thin metal plate such as carbon steel plate or stainless steel plate provided with a layer of a synthetic resin that slides easily, such as polyamide resin (nylon), polytetrafluoroethylene resin (PTFE) or the like on the surface into a U shape, having a top and bottom plate section that are connected by a connecting plate section. Through holes for inserting bolts or studs are formed in portions of the top and bottom plate sections that are aligned with each other. With these sliding plates 16a, 16b mounted on the installation plate sections 14a, 14b, the through holes are aligned with the cutout sections 15a, 15b that are formed in these installation plate sections 14a, 14b.

The bracket 12 on the column side and the bracket 13 on the housing side are supported by the bracket 11 on the vehicle side by screwing nuts onto bolts or studs that are inserted through the cutout sections 15a, 15b in the installation plate sections 14a, 14b and the through holes in the sliding plates 16a, 16b, and tightening the nuts. In the example in the figures, energy absorbing members 17 are provided between these bolts or studs and the bracket 12 on the column side. Furthermore, an electric motor 18, which is the auxiliary power supply of the electric power steering apparatus, is mounted in the housing 10.

During a secondary collision, the bolts or studs come out from the cutout sections 15a, 15b together with the sliding plates 16a, 16b, which allows the steering column 6a and the housing 10 to displace in the forward direction together with the brackets 12 on the column side, the bracket 13 on the housing side and the steering wheel 1. As this bracket 12 on the column side displaces in the forward direction, the energy absorbing members 17 plastically deform so as to absorb the impact energy that is transmitted to the bracket 12 on the column side by way of the steering shaft 5a and steering column 6a.

In the case of the construction illustrated in FIG. 13 to FIG. 15, the bracket 12 on the column side is supported by the bracket 11 on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

In order to stabilize the breaking away of the steering column in the forward direction during a secondary collision, applying the construction disclosed in JP51-121929(U) can be somewhat effective. FIG. 16 to FIG. 18 illustrate the construction disclosed in this document. In the case of this construction, a locking hole (locking notch) 19 is formed in the center section in the width direction of a bracket 11a that is fastened to and supported by the vehicle body and that does not displace in the forward direction even during a secondary collision, and this locking hole 19 is open on the edge of the front end of the bracket 11a on the vehicle side. Moreover, a bracket 12a on the column side is such that it is able to displace in the forward direction together with a steering column 6b during a secondary collision.

Furthermore, both the left and right end sections of a locking capsule 20 that is fastened to this bracket 12a on the column side are locked in the locking hole 19. In other words, locking grooves 21 that are formed on both the left and right side surfaces of the locking capsule 20 engage with the edges on the both the left and right sides of the locking notch 19. Therefore, the portions on both the left and right end sections of the locking capsule 20 that exist on the top side of the locking grooves 21 are positioned on the top side of bracket 11a on the vehicle side on both side sections of the locking hole 19. When the bracket 11a on the vehicle side and the locking capsule 20 are engaged by way of the locking grooves 21 and the edges on both sides of the locking notch 19, locking pins 23 are pressure fitted into small locking holes 22a, 22b that are formed in positions in these members 11a, 20 that are aligned with each other, joining the members 11a, 20 together. These locking pins 23 are made using a relatively soft material such as an aluminum alloy, synthetic resin or the like that will shear under an impact load that is applied during a secondary collision.

When an impact load is applied during a secondary collision from the steering column 6b to the locking capsule 20 by way of the bracket 12a on the column side, these locking pins 23 shear. The locking capsule 20 then comes out in the forward direction from the locking hole 19, which allows the steering column 6b to displace in the forward direction of the steering wheel 1 that is supported by this steering column 6b via the steering shaft.

In the case of the construction illustrated in FIG. 16 to FIG. 18, the engagement section between the locking capsule 20 that is fastened to the bracket 12a on the column side and the bracket 11a on the vehicle side is located at only one location in the center section in the width direction. Therefore, tuning for disengaging this engagement section and causing the steering wheel 1 to displace stably in the forward direction during a secondary collision becomes simple.

However, because the engagement section between the bracket 12a on the column side and the bracket 11a on the vehicle side is located at only one location in the center section in the width direction, the rigidity against the moment that is applied around the steering column 6b (direction of rotation around the center axis of the steering column 6b) to the bracket 12a on the column side from the steering column 6b becomes low.

In the normal operating state, having low rigidity is not particularly a problem. However, when travelling over a bad road, there is a possibility that the steering column 6b will vibrate, and this kind of vibration is also transmitted to the steering wheel 1, so causes discomfort to the driver. Furthermore, even in the case where a conventionally known anti-theft steering lock apparatus (refer to JP10-86792(A) and JP2009-196562) is provided between the steering column 6b and the steering shaft 5b (see FIG. 19) that is supported on the inside of the steering column 6b such that it can rotate freely, a problem such as described below occurs.

As illustrated in FIG. 19, in the basic construction of a steering lock apparatus, a key lock pin 26 is provided in an ignition case (not illustrated in the figure) that is supported by and fastened to the steering column 6c, and this key lock pin 26 is caused to displace in the radial direction of the steering column 6c by the operation of the ignition key (not illustrated in the figure). On the other hand, a key lock collar 27 is fastened by welding or the like to the outer circumferential surface of the steering shaft 5b that is supported on the inside of the steering column 6c such that it can rotate freely. Key lock holes 28 for allowing engagement with the tip end section of the key lock pin 26 are formed at a plurality of locations in the key lock collar 27. When the ignition key is operated and put into the driving state, the key lock pin 26 moves outward in the radial direction of the steering column 6c, and becomes disengaged from the key lock collar 27. In this state, the steering shaft 5b is able to rotate freely inside the steering column 6c. On the other hand, when the ignition key is operated to stop the engine and further put in a state such that the ignition key can be removed, the key lock pin 26 is in a state of matching with the phase of a key lock hole 28, and the key lock pin 26 engages with the key lock collar 27. In this state, the steering shaft 5b is prevented from rotating inside the steering column 6c.

After the steering lock apparatus has been operated in this way, when a force in the direction of rotation is applied to the steering wheel 1 that is supported by and fastened to the rear end section of the steering shaft 5b, a moment that is centered around the steering shaft 5b is applied to the bracket 12a on the column side by way of the steering shaft 5b, key lock collar 27, key lock pin 26, ignition case and steering column 6c. When this bracket 12a on the column side is supported by the vehicle body at two locations on both end section in the width direction as illustrated in FIG. 13, it is possible to maintain sufficient rigidity against the moment around the steering shaft 5b, and there is no particular problem. However, when the bracket 12a on the column side is supported at only one location in the center section in the width direction as illustrated in FIG. 16 to FIG. 18, rigidity against this moment becomes low. More specifically, a large force is applied to the engagement section between the locking capsule 20 and the bracket 11a on the vehicle side. When the amount of relative displacement between the locking capsule 20 and the bracket 11a on the vehicle side becomes large, there is a possibility that damage such as cracking, deformation or the like will occur in one or both of these members 19, 11a, causing the energy absorbing characteristics during a secondary collision to change.

Moreover, in the conventional construction illustrated in FIG. 16 to FIG. 18, the shape of the bracket 11a on the vehicle side is special, so in addition to the construction for connecting and fastening to this bracket 11a on the vehicle side becoming complex, the assembly height increases, and thus design freedom of the steering apparatus is lost.

In other words, in order to install and fasten the bracket 11a on the vehicle side, the installation surface on the vehicle side is a flat surface. The bracket 11a on the vehicle side is formed by bending metal plate in a reverse angle shape, so even though the bending rigidity is high, the bracket 11a cannot be installed and fastened as is to the flat installation surface. Therefore, the bracket 11a on the vehicle side is installed and fastened to the installation surface on the vehicle side by way of a seat plate 24 and connection bracket 25. Therefore, the number of parts increases, the work for processing parts, managing parts and assembling parts becomes troublesome, and the costs are increased. Furthermore, the assembly height, for example, the distance from the center of the steering column 6b to the installation surface on the vehicle side becomes large, and is disadvantageous in that it becomes difficult to perform design for avoiding interference between the steering column 6b and the knees of the driver.

As related literature, JP2000-6821(A) discloses an energy absorbing member that plastically deforms as the steering column displaces in the forward direction together with the steering wheel in order to lessen the impact applied to the body of the driver that collides with the steering wheel during a secondary collision. Moreover, JP2007-69821(A) and JP2008-100597 disclose construction in which adjustment of the steering wheel position is possible, and in which in order to increase the holding force for keeping the steering wheel in the adjusted position the friction surface is increased by overlapping a plurality of friction plates. However, in construction for supporting a bracket on the column side by the bracket on the vehicle side at only one location in the center section in the width direction, technology for preventing damage to the components of this support section, and technology for reducing the number of parts and maintaining design freedom of the steering apparatus are not disclosed in any of these documents.

RELATED LITERATURE

[Patent Literature]
[Patent Literature 1] JP51-121929(U)
[Patent Literature 2] JP2005-219641(A)
[Patent Literature 3] JP10-86792(A)
[Patent Literature 4] JP2009-196562(A)
[Patent Literature 5] JP2000-6821(A)
[Patent Literature 6] JP2007-69821(A)
[Patent Literature 7] JP2008-100597(A)

SUMMARY OF THE INVENTION

Problem to be Solved by the Invention

In consideration of the situation above, the object of the present invention is to provide construction of a steering apparatus for an automobile that simplifies tuning for stabilizing forward displacement of the steering wheel during a secondary collision, and is able to prevent damage to components of the portion for supporting the bracket on the column side by the bracket on the vehicle side.

Another object of the present invention is to provide construction of a steering apparatus for an automobile that is able to reduce the number of parts, simplify the work of processing parts, managing parts and assembling parts, keep costs low, reduce the assembly height and maintain design freedom.

Means for Solving the Problems

The present invention relates to a steering apparatus for an automobile comprising:
a steering column;
a steering shaft that is supported on the inside of the steering column such that the steering shaft can rotate freely, with a steering wheel being fastened to and supported by the rear end section of the steering shaft that protrudes toward the rear from the rear end section of the steering column;
a bracket on the vehicle side that comprises a locking hole that is located in the center section in the width direction of the bracket and extends in the axial direction of the steering column, the bracket being fastened to and supported by a vehicle body such that the bracket does not displace in the forward direction during a secondary collision;
a bracket on the column side that is supported by the steering column and that displaces in the forward direction together with the steering column during a secondary collision; and
a locking capsule that is fastened to the bracket on the column side, and together with both end sections being locked in the locking hole, both sides on the top end are located on the top side of the bracket on the vehicle side in the portions on both sides of the locking hole,
by positioning part of the locking capsule positioned on the inside of locking hole, and connecting this locking capsule and the bracket on the vehicle side, the bracket on the column side being supported by the bracket on the vehicle side such that the bracket on the column side can break away in the forward direction by an impact load that is applied during a secondary collision.

Particularly, the steering apparatus for an automobile of the present invention further comprises a pair of left and right protruding sections in part of the bracket on the column side that protrude further outward in the width direction than the surfaces on the left and right sides of the bracket on the column side, where part of the top edges of these protruding sections are caused to closely face through a small space part of the bottom surface of the bracket on the vehicle side.

With this construction, when a moment around the axial direction is applied to the bracket on the column side and this bracket on the column side is inclined, before a force is applied that would result in damaging the bracket on the column side and the locking capsule, part of the top edge of one of the protruding sections comes in contact with the bottom surface of the bracket on the vehicle side, preventing the bracket on the column side from inclining more than that.

Alternatively, the steering apparatus for an automobile of the present invention further comprises a pair of left and right protruding support sections between the portions on both the left and right sides of the bracket on the column side and both the left and right sides of the bracket on the vehicle side in a state where these protruding support sections protrude from one of the brackets toward the other bracket, with the tip end sections of these protruding support sections coming in contact with the other bracket with a contact pressure that allows sliding in the forward direction due to an impact load of the secondary collision.

With this construction, the rigidity against a moment around the center axis of the steering column of the bracket on the column side with respect to the bracket on the vehicle side is improved.

In either construction, preferably, the locking capsule and the bracket on the vehicle side are connected by a connecting member that shears due to an impact load that is applied during the secondary collision.

Preferably, the steering apparatus of the present invention comprises both the protruding sections and the protruding support sections. In other words, the steering apparatus comprises a pair of left and right protruding sections in part of the bracket on the column side that protrude further outward in the width direction than the surfaces on the left and right side of the bracket on the column side, where part of the top edges of these protruding sections are caused to face through a small space part of the bottom surface of the bracket on the vehicle side, and further comprises a pair of left and right protruding support sections between the portions on both the left and right sides of the bracket on the column side and both the left and right sides of the bracket on the vehicle side in a state where these protruding support sections protrude from one of the brackets toward the other bracket, with the tip end sections of these protruding support sections coming in contact with the other bracket with a contact pressure that allows sliding in the forward direction due to an impact load of the secondary collision.

In this case, preferably, the protruding support sections are formed such that these protruding support sections protrude upward toward the rear from the top edges of the protruding sections, with the top end sections of these protruding support sections coming in elastic contact with part of the bottom surface of the bracket on the vehicle side.

The present invention can suitably be applied to a steering apparatus for an automobile that comprises a steering lock apparatus that prevents rotation of the steering shaft inside the steering column according to operation of the ignition key in a direction that stops the engine.

In the steering apparatus for an automobile of the present invention preferably the locking capsule comprises a lower half section having a width dimension that is equal to or less than the width dimension of the locking hole, and an upper half section having a width dimension that is greater than the width dimension of the locking hole and flange sections on both end sections in the width direction that protrude further to both sides in the width direction than the surfaces on both sides in the width direction of the lower half section; small through holes are formed in the flange sections and in part of the bracket on the vehicle side in portions on both sides of the locking hole in positions that are aligned with each other; and with the bottom surface of the locking capsule in contact with the top surface of the bracket on the vehicle side, and portions of part of the bracket on the vehicle side on both sides of the locking hole being held between the bottom surface of the flange sections and the top surface of the bracket on the column side, connecting members span between the small through holes that are formed in the flange sections and the small through holes that are formed in part of the bracket on the vehicle side.

In this construction, preferably the connecting member is synthetic resin connecting pins that are formed by injection molding of injecting molten resin into the small through holes, where part of the synthetic resin that forms these locking pins penetrates in between the bottom surface of the bracket on the vehicle side and the top surface of the bracket on the column side, and between the top surface of the bracket on the vehicle side and the bottom surfaces of the flange sections, with this synthetic resin preventing vibration due to the space between these surfaces.

In the steering apparatus for an automobile of the present invention, the bracket on the vehicle preferably further comprises an installation plate section. The top surfaces of both end sections in the width direction of the installation plate section of the bracket on the vehicle side are located on the same plane. With the top surfaces of both end sections in the width direction of the installation section in contact with an installation surface that is formed on the vehicle side, the bracket on the vehicle side is connected and fastened to the vehicle body. Furthermore, part of the installation plate section is bent downward such that there is no interference with the installation surface.

In this construction, preferably a bent section that is continuous along the entire length is formed by bending downward the portion of the edge around the installation plate section except the edge on the front end. Alternatively, ribs that protrude downward are preferably formed at a plurality of locations in the forward/backward direction of the installation plate section.

Furthermore, in the steering apparatus for an automobile of the present invention, preferably the length in the forward/backward direction of the locking hole is greater than the length in the forward/backward direction of the locking capsule, with the length of the locking capsule being just long enough that even when the locking capsule has displaced in the forward direction together with the steering column due to a secondary collision, at least part of the locking capsule is positioned on the top side of the front end section of the bracket on the vehicle side, preventing the locking capsule from dropping down.

Effect of the Invention

In the steering apparatus for an automobile of the present invention, the engagement section between the locking capsule that is fastened to the bracket on the column side and the locking hole that is formed in the bracket on the vehicle side is at only one location in the center section in the width direction, so tuning for disengaging this engagement section and stabilizing forward displacement of the steering wheel during a secondary collision is simple.

As the engagement section is at only one location in the center section in the width direction, rigidity of the bracket on the column side against a moment around the steering column decreases, however, the amount of relative displacement between the bracket on the column side and the locking capsule due to this moment does not become excessive. In other words, in construction in which a pair of left and right protruding sections are formed on the bracket on the column side, as swiveling displacement of the bracket on the column side with respect to the bracket on the vehicle side due to the moment occurs, while the amount of this displacement is still small, part of the top edge of one of the pair of left and right protruding sections that are formed on the bracket on the column side comes in contact with part of the bottom surface of the bracket on the vehicle side, preventing the bracket on the column side from inclining more than this. Therefore, a force large enough to damage the bracket on the column side and the locking capsule is not applied to the bracket on the column side and the locking capsule.

Moreover, in construction in which a pair of left and right protruding support sections are formed between the bracket on the column side and the bracket on the vehicle side, the left and right protruding support sections provide support between the bracket on the column side and the bracket on the vehicle side and complements a drop in rigidity. Therefore, in the case where a moment on the level of a vibration is applied to the bracket on the column side during normal driving, such as when travelling over a bad road, it is possible to suitably suppress displacement of the bracket on the column side, and to prevent the bracket on the column side from vibrating.

Furthermore, in construction in which an installation plate section is provided on the bracket on the vehicle side, it is possible, except for a minimum of thin washers, to essentially connect and fasten the bracket on the vehicle side to the vehicle body. Therefore, there is no need for a connecting bracket such as assembled in conventional construction, making it possible to reduce costs and maintain design freedom. By bending part of the installation plate section downward, it is possible to improve the bending rigidity of the installation plate section, and even when the top surfaces of both end sections in the width direction of this installation plate section are located on the same plane, it is possible to maintain the rigidity of the bracket on the vehicle side, and to suppress vibration and the like of the steering column that is supported by the vehicle body by way of this bracket on the vehicle side.

BEST MODES FOR CARRYING OUT THE INVENTION

Embodiment 1

Figure 12:
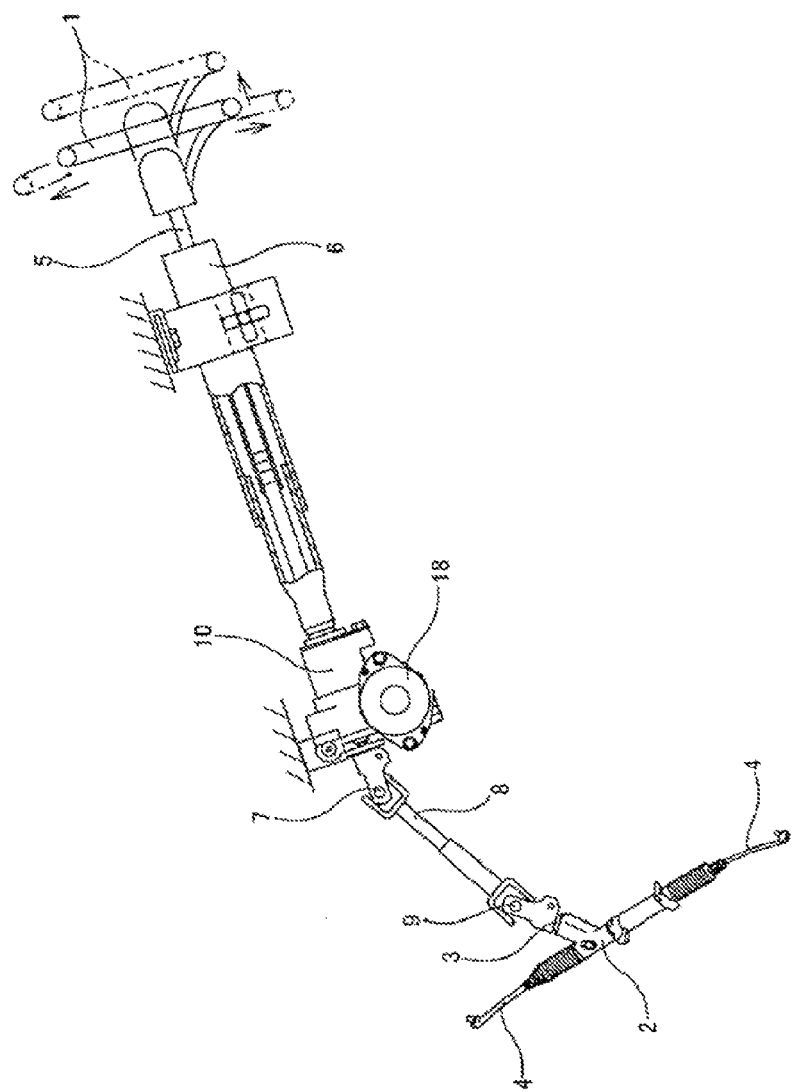
FIG. 12 illustrates an example of a conventionally known steering apparatus for an automobile, and is a partial cross-sectional view.
Figure 13:
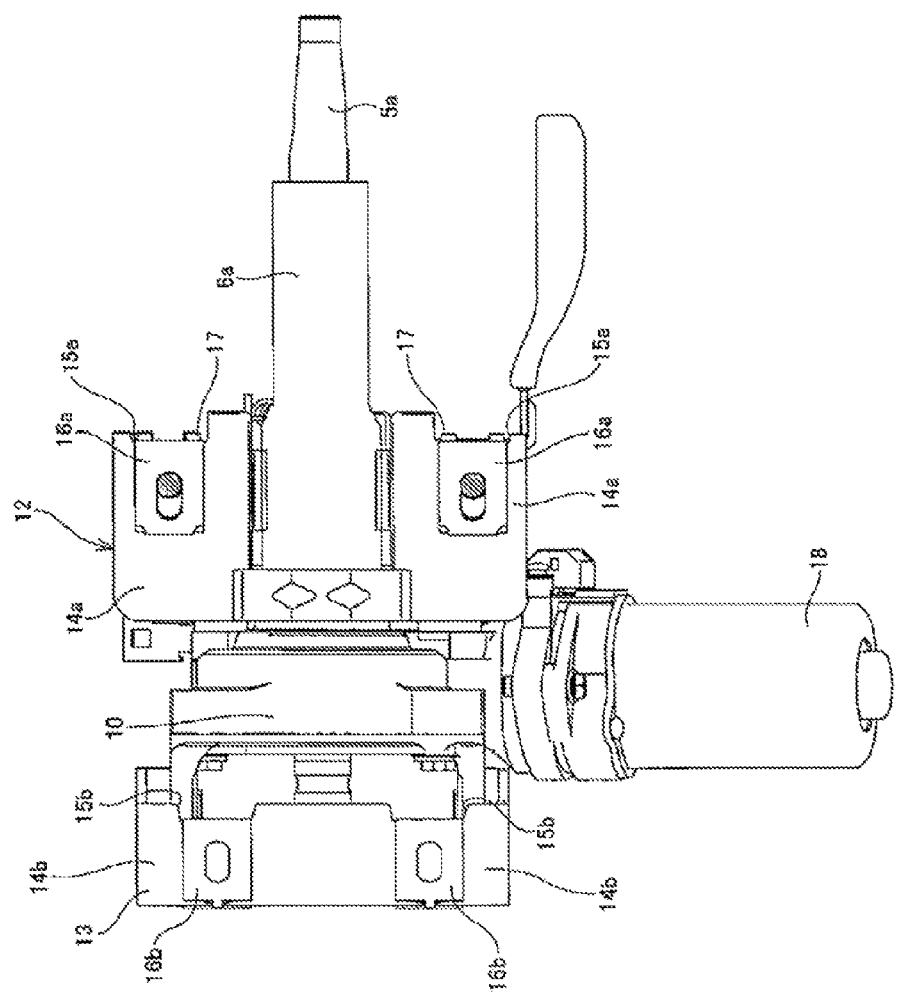
FIG. 13 illustrates an example of a conventionally known steering apparatus for an automobile, and is a top view that illustrates the normal state.
Figure 14:
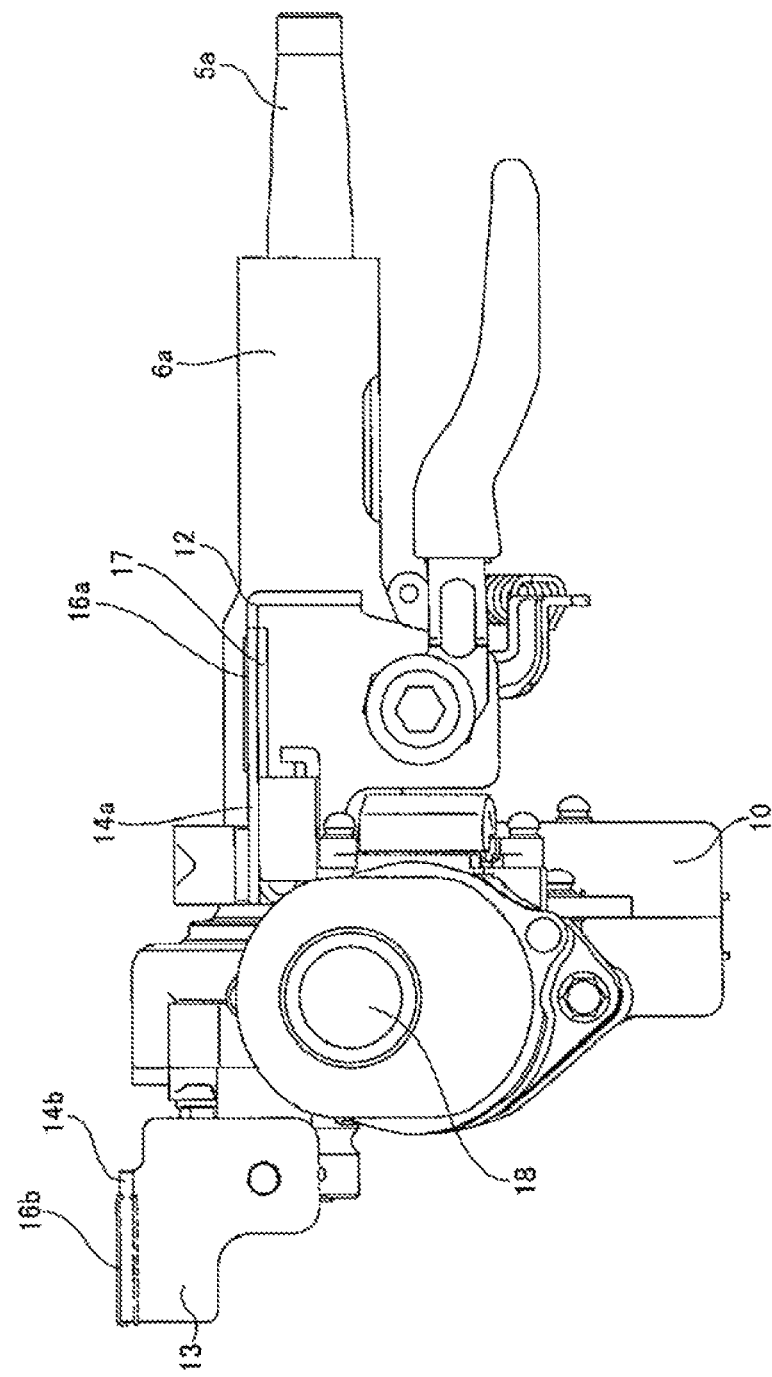
FIG. 14 is a side view that illustrates the normal state of the apparatus in FIG. 13.
Figure 15:
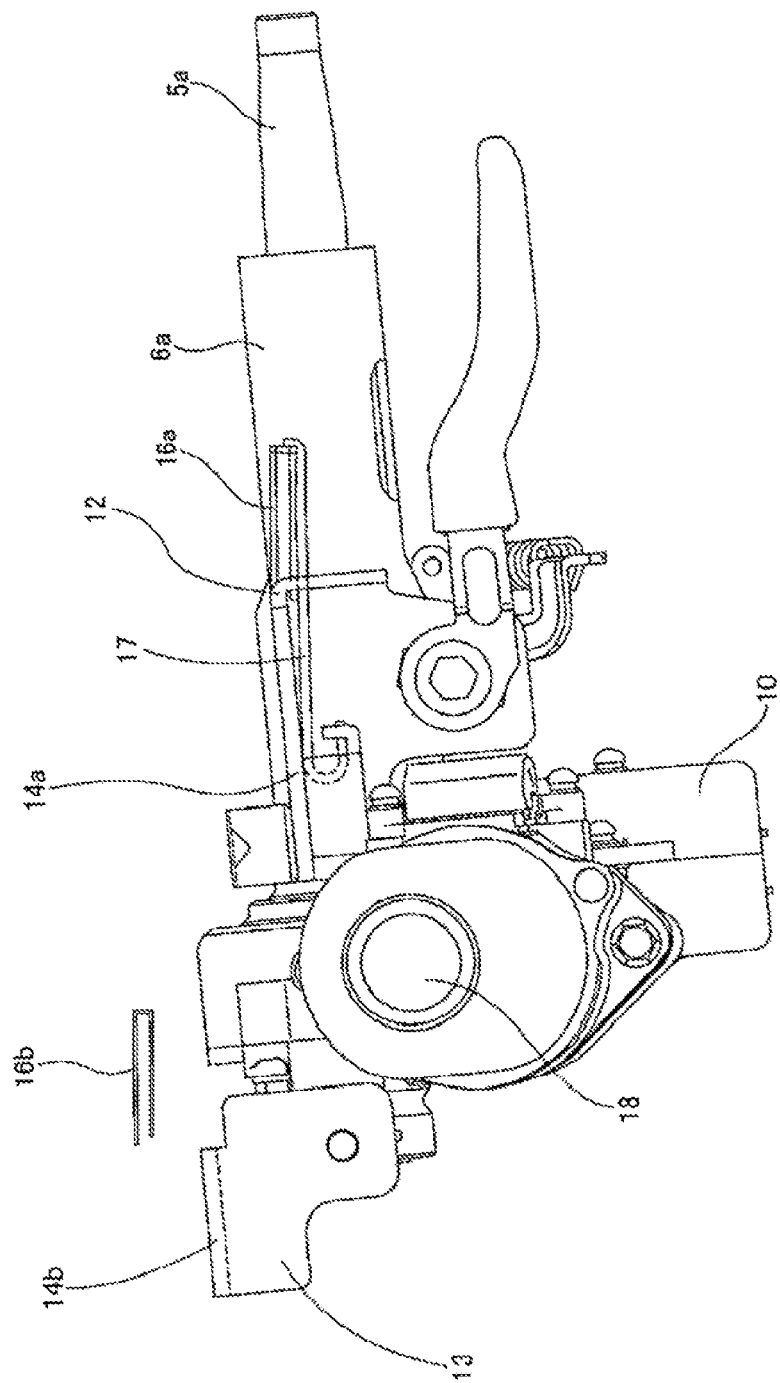
FIG. 15 is a side view that illustrates the state of the apparatus in FIG. 13 when a secondary collision has advanced.
Figure 16:
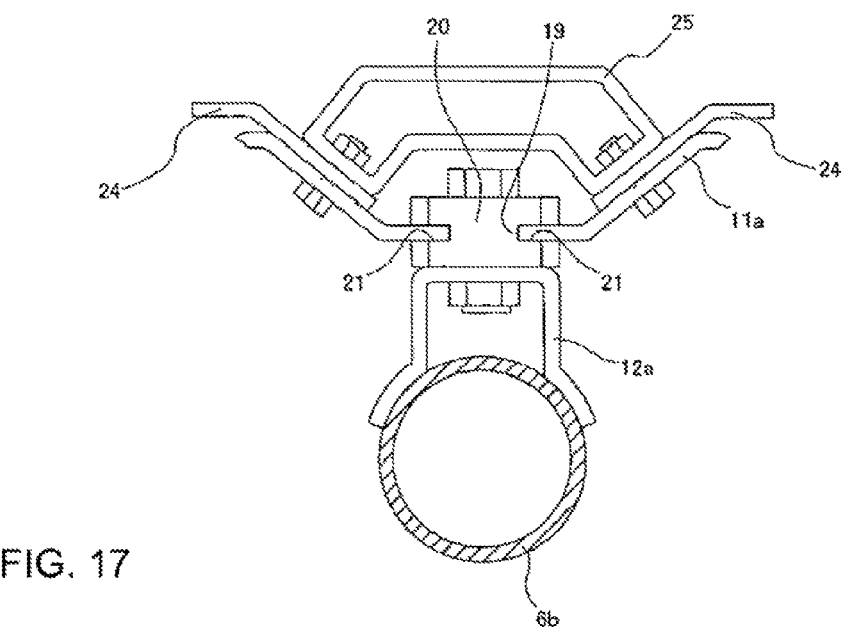
FIG. 16 illustrates an example of conventional construction, and is a cross-sectional view of a virtual plane that exists in a direction orthogonal to the center axis of the steering column.
Figure 17:
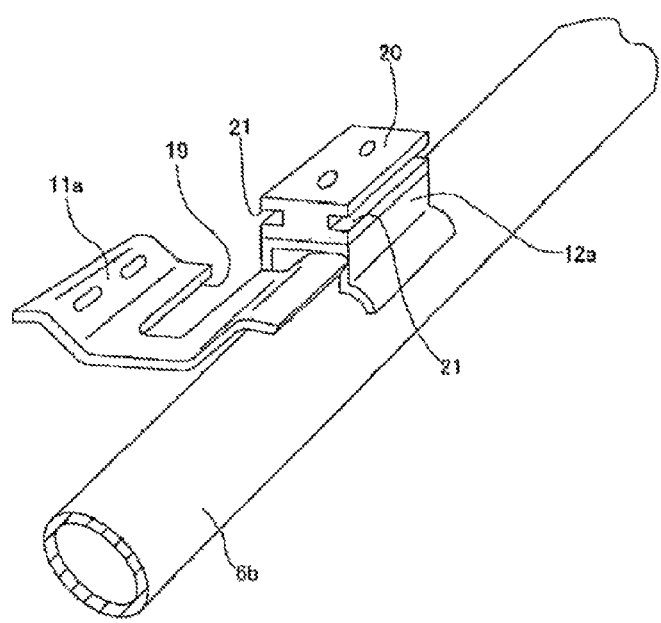
FIG. 17 is a perspective view of the apparatus in FIG. 16, and illustrates the state before connecting the bracket on the vehicle side and the bracket on the column side.
Figure 18:
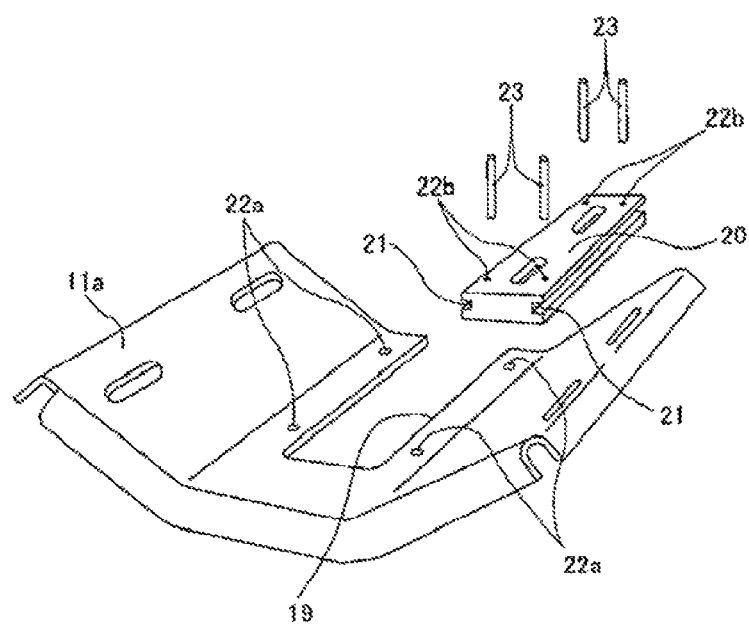
FIG. 18 is a perspective view of the apparatus in FIG. 16 in which the connecting pins are depicted instead of the steering column and the bracket on the column side being omitted.
Figure 19:
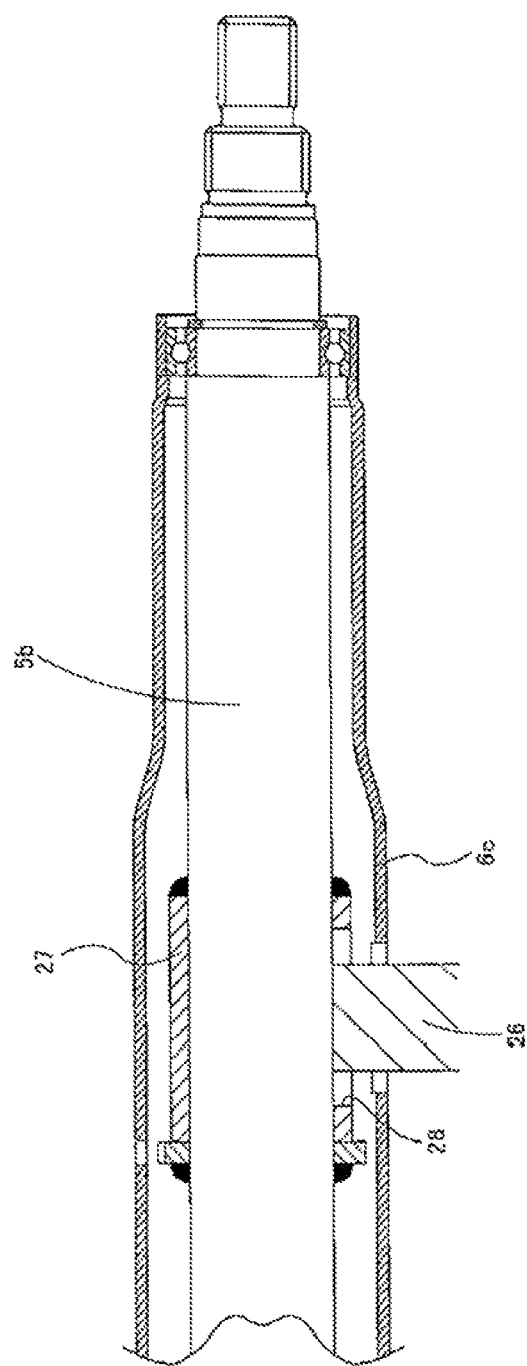
FIG. 19 is a partial cross-sectional view illustrating an example of a known steering lock apparatus.

FIG. 1 to FIG. 5 illustrate a first embodiment of the present invention. This embodiment illustrates the case of applying the present invention to a tilting and telescopic type steering apparatus that comprises both a tilting mechanism for adjusting the up/down position of the steering wheel 1 (see FIG. 12) and a telescopic mechanism for adjusting the forward/backward position of the steering wheel 1.

In order to construct a telescopic mechanism, a telescopic shaped steering column 6d that can expand or contract along the entire length by fitting the rear section of an inner column 29 on the front side inside the front section of an outer column 30 on the rear side is used. A steering shaft 5c is supported in the inner diameter side of this steering column 6d such that it can rotate freely, however, this steering shaft 5c as well is constructed such that by a male spline section that is formed on the rear section of a circular rod shaped inner shaft that is located on the front side engaging with a female spline section that is formed on the front section of a cylindrical shaped outer shaft 31 that is located on the rear side, the steering shaft 5c can transmit torque as well as expand and contract. With the rear end section of the outer shaft 31 protruding further toward the rear than the opening on the rear end of the outer column, the outer shaft 31 is supported on the inner diameter side of the outer column 30 by a bearing such as a single-row deep groove ball bearing 32 or the like that is capable of supporting both a radial load and thrust load such that only rotation is possible. A steering wheel 1 is supported by and fastened to the rear end section of the outer shaft 31. When adjusting the forward/backward position of this steering wheel 1, the outer shaft 31 and the outer column 30 displace in the forward or backward direction, and the steering shaft 5c and steering column 6d expand or contract.

A housing 10a for housing a reduction gear and the like of an electric power steering apparatus is connected and fastened to the front end section of the inner column 29 of this steering column 6d. An electric motor 18a, which is an auxiliary power source for the electric power steering apparatus, and a controller 33 for controlling the flow of electricity to this electric motor 18a are fastened to and supported by the top surface of the housing 10a. In order to construct the tilting mechanism, the housing 10a is supported by the vehicle body such that it can swivel around a horizontal shaft. In order for this, a support cylinder 34 is provided in the left/right direction on the upper front end of the housing 10a, and the front end section of the steering column 6c is supported by the vehicle body by a horizontal shaft such as a bolt that is inserted through a center hole 35 in the support cylinder 34 such that the rear section of this steering column 6d can swivel in the raising or lowering direction.

The inner diameter of the front half of the outer column 30 of the middle section or rear section of the steering column 6d can expand or contract elastically. In order for this, a slit 38 is formed in the axial direction on the bottom surface of the outer column 30. The front end section of this slit 38 opens up to a through hole 34 in the circumferential direction that is formed on the edge of the front end of the outer column 30 or in the portion near the front end section of the outer column 30 except the top end section. A pair of thick plate-shaped supported plate sections 39 is located in the portion between both sides in the width direction of the slit 38. These supported plate sections 39 displace together with the outer column 30 when adjusting the position of the steering wheel 1, and function as brackets on the displacement side.

In the case of this embodiment, the supported plate sections 39 are supported by a bracket 12b on the column side such that adjustment of the up/down position and forward/backward position is possible. This bracket 12b on the column side is normally supported by the vehicle body, however, during a collision accident, breaks away in the forward direction due to the impact of a secondary collision, which allows displacement in the forward direction of the outer column 30. In order for this, the bracket 12b on the column side is supported by a bracket 11 on the vehicle side such that it can break away in the forward direction due to an impact load that is applied during a secondary collision.

The adjustment section of the tilting mechanism and telescopic mechanism is constructed by firmly holding the supported plate sections 39 by a pair of left and right support plate sections 41 of the bracket 12b on the column side. Long holes 42 in the up/down direction having a partial arc shape that are centered around the horizontal shaft that supports the support cylinder 34 with respect to the vehicle body are formed in these support plate sections 41, and long holes 43 in the forward/backward direction that are long in the axial direction of the outer column 30 are formed in the supported plate sections 39. An adjustment rod 44 is inserted through these long holes 42, 43. A head section 45 that is located on the base end section (right end section in FIG. 2) of this adjustment rod 44 engages with the long hole in the up/down direction that is formed in one of the support plate sections 41 (right support plate section in FIG. 2) to prevent rotation, and only allows displacement along this long hole in the up/down direction. On the other hand, a cam apparatus 49 having a driving cam 47 and a driven cam 48 is provided between the nut 46 that is screwed onto the tip end section (left end section in FIG. 2) of the adjustment rod 44 and the outside surface of the other support plate section 41 (left support plate section in FIG. 2). Of these cams, the driving cam 47 can be rotated and driven by an adjustment lever 50.

When adjusting the position of the steering wheel 1, the driving cam 47 is rotated and driven by rotating the adjustment lever 50 in a specified direction (downward), shortening the dimension in the axial direction of the cam apparatus 49. This widens the space between the inside opposing surfaces of the driven cam 48 and the head section 45, and releases the force that the support plate sections 41 on both sides apply to the supported plate sections 39. At the same time, the inner diameter of the portion on the front section of the outer column 30 in which the rear section of the inner column 29 is fitted elastically expands, which lowers the contact pressure that acts in the area of contact between the inner circumferential surface on the front section of the outer column 30 and the outer circumferential surface on the rear section of the inner column 29. In this state, the up/down position and the forward/backward position of the steering wheel 1 can be adjusted within the range in which the adjustment rod 44 can be displaced between the long holes 42 in the up/down direction and the long holes 43 in the forward/backward direction.

After the steering wheel 1 has been moved to a desired position, the dimension in the axial direction of the cam apparatus 49 is expanded by rotating the adjustment lever 50 in the opposite direction (upward) of the specified direction above. As a result, the space between opposing inside surfaces of the driven cam 48 and the head section 45 is shortened, and the supported plate sections 39 are held firmly on both sides by the support plate sections 41. At the same time, the inner diameter of the portion on the front section of the outer column 30 in which the rear section of the inner column 29 is fitted elastically contracts, and the contact pressure acting at the area of contact between the inner circumferential surface of the front section of the outer column 30 and the outer circumferential surface of the rear section of the inner column 29 increases. In this state, the steering wheel 1 is held in the adjusted up/down and forward/backward positions.

In this embodiment, in order to increase the supporting force for holding the steering wheel 1 in the adjusted position, friction plate units 51 are held between the inside surfaces of the support plate sections 41 and the outside surfaces of the supported plate sections 39. These friction plate units 51 are formed by alternately overlapping one or a plurality of first friction plates having long holes that are aligned with the long holes 42 in the up/down direction, and one or a plurality of second friction plates having long holes that are aligned with the long holes 44 in the forward/backward direction. The detailed construction and function of this kind of friction plate unit 47 is known (JP2000-6821(A) and JP2007-69821), and is not related to the gist of the present invention, so a detailed drawing and explanation are omitted.

Furthermore, the bracket 12b on the column side breaks away in the forward direction with respect to the bracket 11 on the vehicle side due to the impact load of a secondary collision, however, is supported so that it cannot drop downward even as the secondary collision advances. The bracket 11 on the vehicle side is fastened to and supported by the vehicle body, and does not displace in the forward direction during a secondary collision, and this bracket is formed by punching and bending of metal plate, such as steel plate, having sufficient strength and rigidity.

Figure 2:
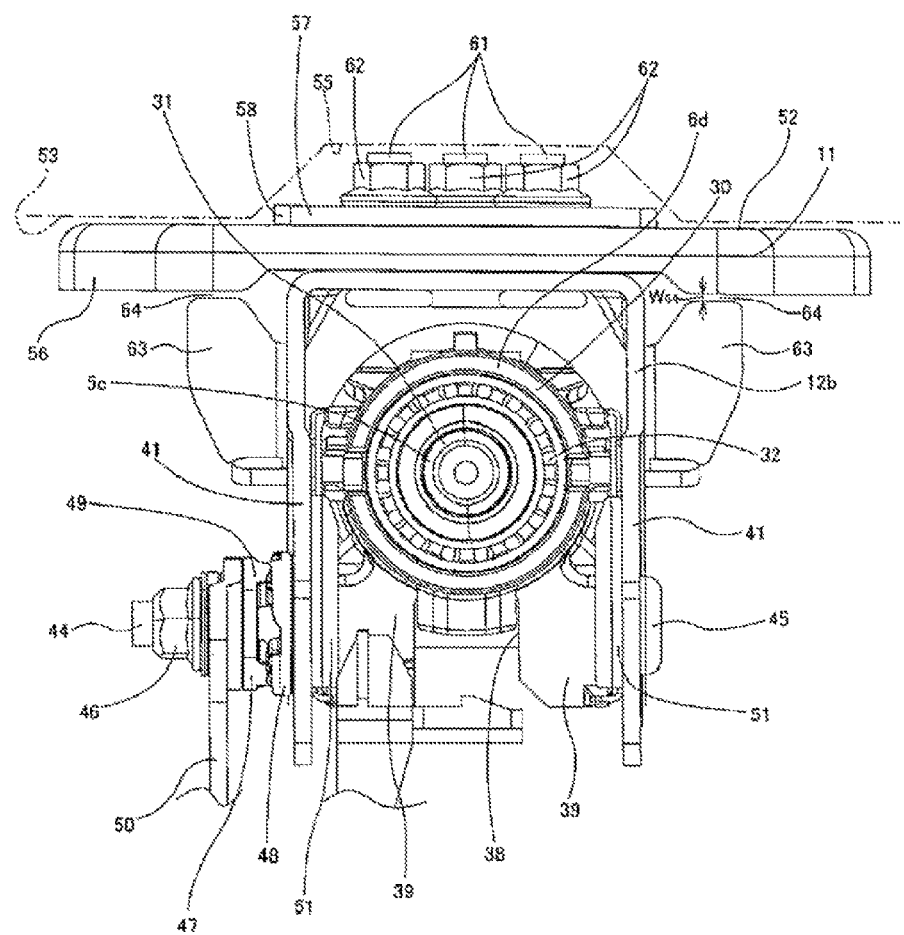
FIG. 2 is an orthographical view of the first embodiment, and illustrates the state as seen from the rear, with part being omitted.
Figure 3:
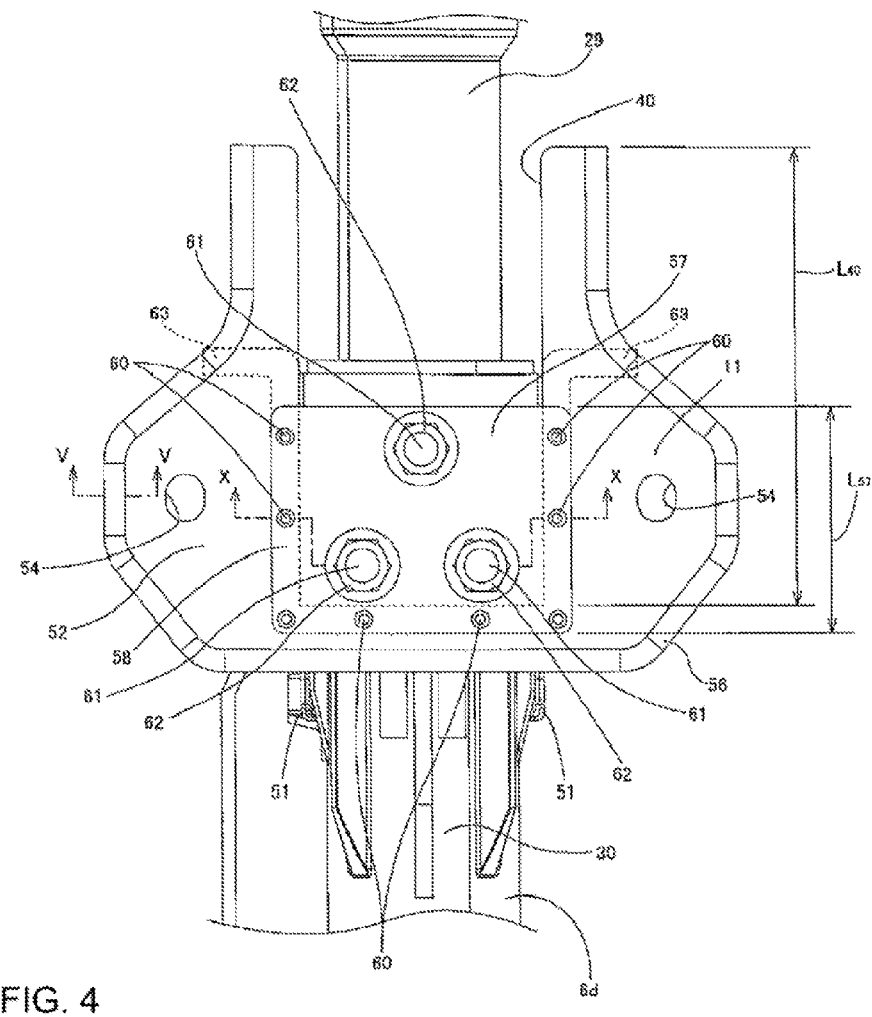
FIG. 3 is a top view illustrating the first embodiment, and illustrates the state as seen from above in FIG. 2.

The bracket 11 on the vehicle side comprises a flat installation plate section 52. The top surfaces of both end sections in the width direction of this installation plate section 52 are located on the same plane as each other. This kind of installation plate section 52, as illustrated in FIG. 2, is fastened to and supported by the vehicle body by joining it to an installation surface 53 that is formed on the vehicle side, and inserting bolts or studs (not illustrated in the figure) into a pair of through holes 54 that are formed in both end sections in the width direction. A concave section 55 that is concave in the upward direction is formed in the center section of the installation surface 53 in order to prevent interference with the bolts 54 and nuts 55. However, the portions of the installation surface 53 on both the left and right sides of this concave section 55 that come in contact with the top surfaces of both end sections in the width direction of the installation plate section 52 are flat surfaces that are on the same plane. The planar shape of the installation plate section 52 is nearly a pot shape. More specifically, the width dimension of the front half section is smaller than the width dimension of the rear half section, and of these, in the rear half section, the width dimension of the center section in the forward/backward direction is the largest, and the width dimension gradually becomes smaller in the direction going away from the center section in the forward/backward direction.

Figure 4:
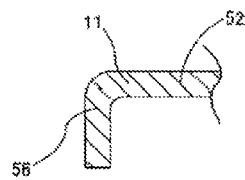
FIG. 4 is an enlarged cross-sectional view of section V-V in FIG. 3.

As illustrated in FIG. 2 and FIG. 4, a bent section 56 that is bent downward and that is continuous around the entire length is formed on the outer edge of this kind of installation plate section 52 except the edge on the front end. In other words, by bending the outer edge section except the front edge section of the installation plate section 52 downward so that there is no interference with the installation surface 53, and so that displacement in the forward direction of a locking capsule 57, 57a is not hindered during a secondary collision, the bending rigidity of the bracket 11 on the vehicle side that includes this installation plate section 52 is improved. The construction for improving the bending rigidity of this bracket 11 on the vehicle side is not limited to the formation of a bending section 56. As long as construction is such that there is no interference with the installation surface 53 and displacement in the forward direction of the locking capsule 57, 57a is not hindered, construction can be employed in which one part of the edge around the installation plate section is bent downward, or a different part of the installation plate section is bent downward.

A locking hole (locking notch) 40 that extends in the axial direction of the steering column 6d and that is open on the front edge is formed in the center section in the width direction of the bracket 11 on the vehicle side, and installation holes 54 are formed in locations in the rear section of the bracket 11 on the vehicle side on both the right and left side of the locking hole 40. This locking hole 40 is formed up to near the rear end section of the bracket 11 on the vehicle side that is covered by the locking capsule 57. As illustrated in FIG. 2, with this kind of bracket 11 on the vehicle side aligned with the installation surface 48 that is formed on the vehicle side, the bracket 11 on the vehicle side is fastened to and supported by the vehicle body by bolts or studs that are inserted through the installation holes 54. In this embodiment, the locking hole 40 is formed as a locking notch that is open on the front edge, however, the shape of the locking hole 40 is not limited to this, and it is also possible to extend the hole in the axial direction of the steering column, and form a closed hole that is closed on the front end, and that prevents the locking capsule 57, 57a from dropping downward from the bracket 11 on the vehicle side.

Figure 1:
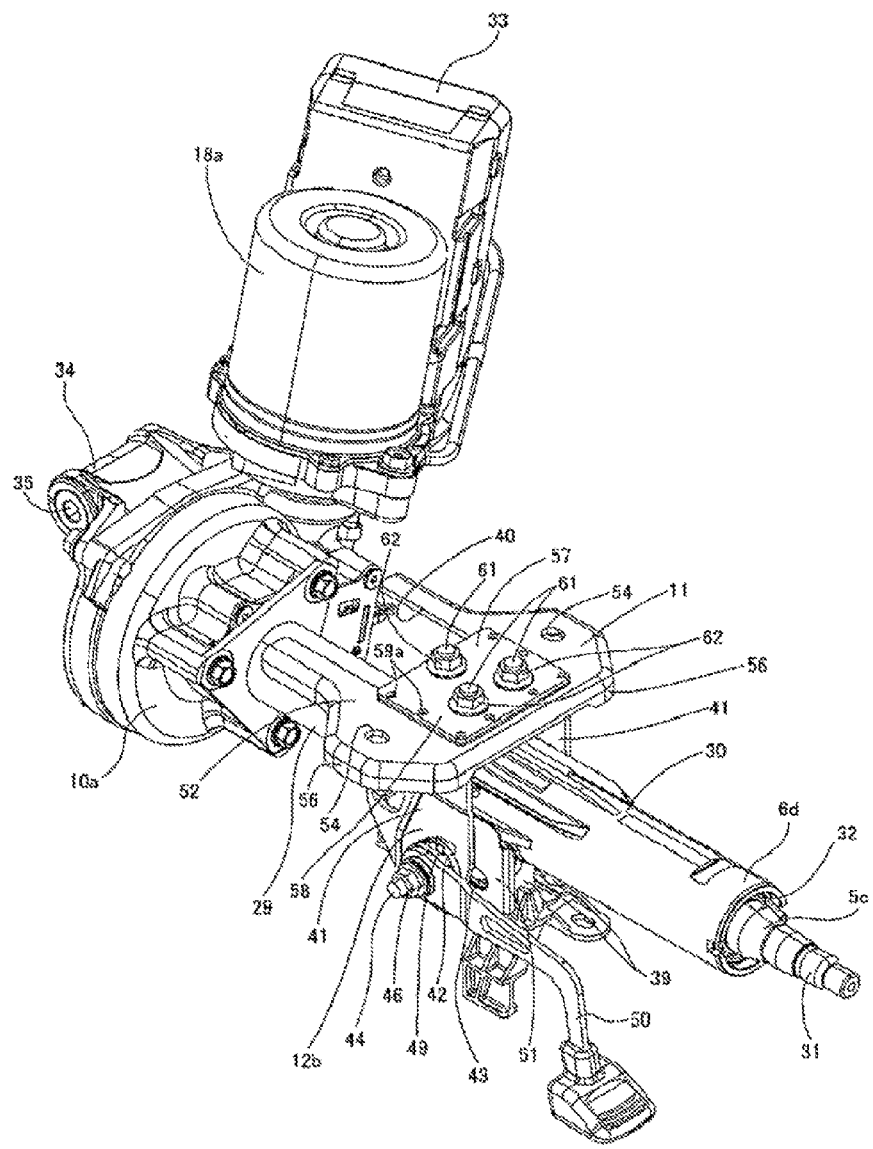
FIG. 1 is a perspective drawing illustrating a first embodiment of the present invention, and illustrates the state as seen from the upper rear.

The bracket 12b on the column side is connected to the bracket 11 on the vehicle side by way of the locking capsule 57 so that it can break away in the forward direction during a secondary collision. Preferably, a locking capsule that is constructed as illustrated in FIG. 1, FIG. 2 and FIG. 5A is used as this locking capsule 57, however, it is also possible to use a locking capsule 57a such as illustrated in FIG. 5B. The case of the locking capsule 57a that is illustrated in FIG. 5B will be explained later, and the case of using the locking capsule 57 illustrated in FIG. 1, FIG. 2 and FIG. 5A will be explained below.

This locking capsule 57 is formed by plastic working such as forging of an iron alloy such as mild steel, die casting a light alloy such as an aluminum alloy or magnesium alloy, or injection molding of a high strength high functional polymer such as polyacetal. The width dimension in the left and right direction and the length dimension in the forward and backward direction are larger in the upper half section than in the lower half section, and a flange section 58 that protrudes toward both sides and toward the rear is formed on the upper half section of the surfaces of both the left and right sides and the rear. With the lower half section of this kind of locking capsule 57 engaged with (fitted inside) the locking hole 40, the locking capsule 57 is supported by the bracket 11 on the vehicle side such that it can break away in the forward direction due to an impact load that is applied during a secondary collision. In order for this, small through holes 59a, 59b are respectively formed at a plurality of location (8 locations in the example in the figure) in the flange section 58 and the peripheral edge of the locking hole 40 in part of the bracket 11 on the vehicle side so that they are aligned with each other. The locking capsule 57 and the bracket 11 on the vehicle side are connected by inserting locking pins 60 such as to span between these pairs of small through holes 59a, 59b.

Figure 5:
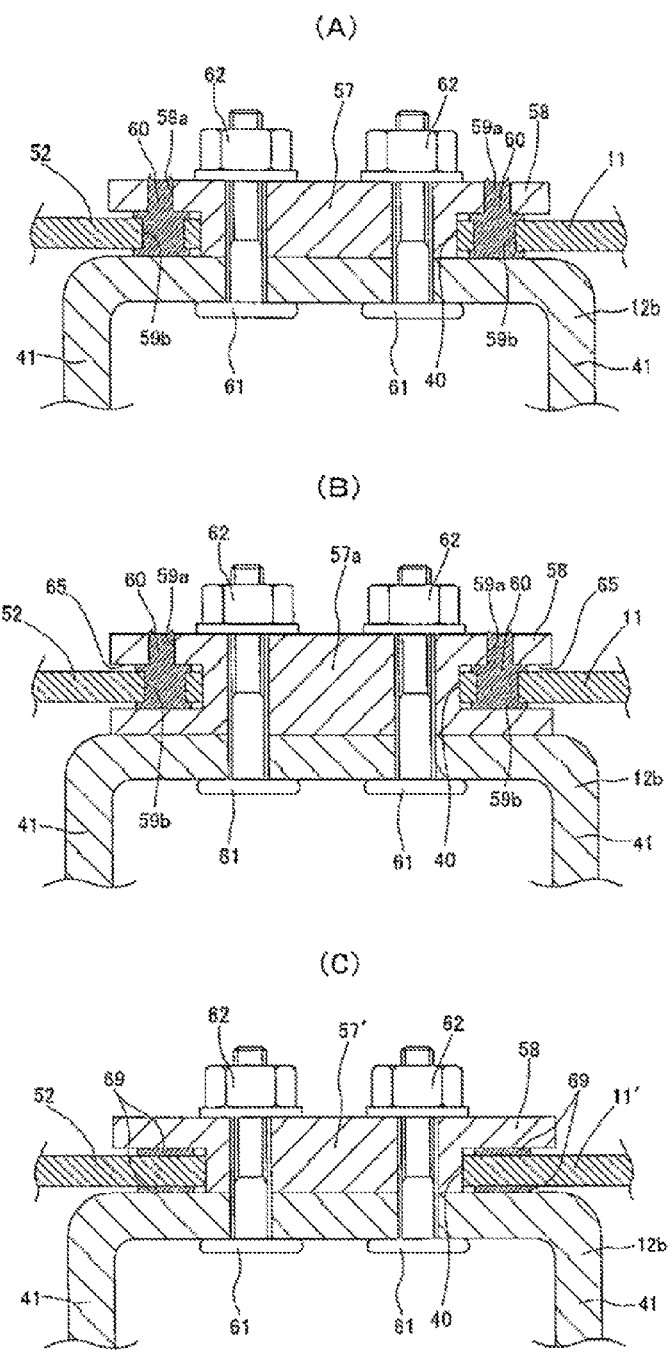
FIG. 5A to FIG. 5C are cross-sectional views of section X-X in FIG. 3, and illustrate three examples of the construction of the connecting section between the bracket on the vehicle side and the bracket on the column side.

With the small through holes 59a, 59b aligned, these locking pins 60 can be formed by injection molding by injecting synthetic resin inside the aligned small through holes 59a, 59b, or pins can be formed into a cylindrical shape beforehand using synthetic resin or light metal alloy, and then pressure fitted into the small through holes 59a, 59b such that they span between these small through holes 59a, 59b. In either case, part of the synthetic material or light metal alloy material of the locking pins 60 is located between the top and bottom surfaces of the bracket 11 on the vehicle side and the opposing surfaces, which are the bottom surface of the flange section 58 and the top surface of the bracket 12b on the column side. Regardless of whether there is a space between these surfaces, vibration of the installation section of the bracket 12b on the column side with respect to the bracket 11 on the vehicle side is eliminated. Therefore, in order to completely close these spaces and completely eliminate this vibration, the locking pins 60 are preferably made by injection molding of synthetic resin. In FIG. 5, for clarity, the height of the space, which is the cause of the vibration above, is drawn larger than the actual size.

When the locking pins 60 are formed by injection molding, the molten resin enters into the spaces between the top and bottom surfaces of the bracket 11 on the vehicle side and the opposing surfaces, and then cools and becomes solidified, eliminating the vibration. On the other hand, when pins are pressure fitted, the portions in the middle in the axial direction of the pins that corresponds to the spaces expand outward in the radial direction due to the axial force that is applied to the pins, which eliminates the vibration due to the spaces between these surfaces. In either case, by the locking pins 60 spanning between the small through holes 59a, 59b, the locking capsule 57 is supported by the bracket 11 on the vehicle side such that it can break away in the forward direction due to an impact load that is applied during a secondary collision.

This locking capsule 57 is connected and fastened to the bracket 12b on the column side by a plurality of bolts 61 and nuts 62 (three in the example in the figure) in a non-separated state regardless of any impact load. In other words, by inserting bolts 61 from the bottom through the through holes that are formed in aligned positions in the locking capsule 57 and bracket 12b on the column side, and then screwing nuts 62 onto the portions on the tip end sections (top end sections) of the bolts 61 that protrude from the top surface of the locking capsule 57, and tightening the nuts 62, the locking capsule 57 and the bracket 12b on the column side are connected and fastened together. Therefore, during a secondary collision, the impact load that is transmitted from the outer column 30 to this bracket 12b on the column side is transmitted as is to the locking capsule 67, and when the locking pins 60 shear, the outer column 30 also displaces in the forward direction in synchronization with the displacement in the forward direction of the locking capsule 57.

However, the construction for the connection between the bracket 11 on the vehicle side and the bracket 12b on the column side, or the locking capsule 57 that is fastened to the bracket 12b on the column side is not limited to the locking pins above, and it is possible to employ other construction that allows the bracket 12b on the column side and the locking capsule 57 to displace or break away only due to an impact load that is applied during a secondary collision without normally breaking away from the bracket 11 on the vehicle side. For example, as illustrated in FIG. 5C, construction can be employed where in the place of the locking pins 60, a bracket 11' on the vehicle side and a locking capsule 57' that have no small through holes are used, a low friction material 69 made of synthetic resin is filled in or used as a coating between the bottom surface of the locking capsule 57' and the top surface of the bracket 11' on the vehicle side, and between the bottom surface of the bracket 11' on the vehicle side and the top surface of the bracket 12b on the column side, and with the bracket 11' on the vehicle side surrounded on both surfaces with the low-friction material 69, the locking capsule 57' and bracket 12b on the column side are fastened together by tightening the bolts 61 and nuts 62. In this construction, by adjusting the friction force of the low-friction material 69, it is possible to connect and fasten the bracket 12b on the column side to the bracket 11' on the vehicle side so that the bracket 12b on the column side displaces or breaks away only due to an impact load that is applied during a secondary collision.

The length $L_{40}$ in the forward/backward direction of the locking hole 40 that locks the locking capsule 57 that displaces in the forward direction together with the outer column 30 during a secondary collision in this way is sufficiently larger than the length $L_{57}$ in the same direction of the locking capsule 57 ($L_{40} \gg L_{57}$). In the case of this embodiment, length $L_{40}$ of the locking hole 40 is kept at two times greater or more than the length $L_{57}$ of the locking capsule 57 ($L_{40} \geq 2L_{57}$). During a secondary collision, even when the locking capsule 57 has displaced completely forward together with the outer column 30, or in other words, even when the locking capsule 57 has stopped displacing in the forward direction due to the impact load that was applied from the steering wheel 1, the portion of at least the rear end section of the flange section 58 of the locking capsule 57 that is capable of supporting the weight of the steering column 6d and bracket 12b on the column side does not come out completely from the locking hole 40. That is, even when the secondary collision has advanced, the rear end section of the flange section 58 that is formed on the upper half section of the portions on both sides in the width direction of the locking capsule 57 is positioned on the top side of the front end section of the bracket 11 on the vehicle side, and is able to prevent the locking capsule 57 from dropping down. As was described above, even when the locking hole is formed as a closed hole that is not open on the front edge, the locking capsule 57 is prevented from dropping down from the bracket 11 on the vehicle side.

Furthermore, a pair of left and right protruding sections 63 that protrude further outward in the width direction than the left and right outside surfaces of the bracket 12b on the column side are formed on part of the bracket 12b on the column side. In this embodiment, the protruding sections 63 are formed by bending from the top sections of the front end edges of the pair of left and right support plate sections 41 of the bracket 12b on the column side outward in the width direction at nearly right angles. Part of the top edges of these protruding sections are brought to face the bottom surface of the bracket 11 on the vehicle side through a small space 64. More specifically, in order to improve the bending rigidity of the bracket 11 on the vehicle side, part of the top edges of the protruding sections 63 are made to face the bottom end surface of part of the bottom edge of the bent section 56 that is formed by bending down the edge around the bracket 11 on the vehicle side.

When a moment around the axial direction is applied to the bracket 12b on the column side, causing the bracket 12b on the column side to be sloped a little, part of the top edge of one of the protruding sections 63 comes in contact with part of the bottom edge of the bent section 56 and prevents the bracket 12b on the column side from sloping more. In this state, the amount of slope of the bracket 12b on the column side (the amount of torsion of the outer column 30) depends on the width dimension $W_{64}$ of the space 64. Therefore, this width dimension $W_{64}$ is kept as small as possible within a range that does not hinder displacement in the forward direction of the bracket 12b on the column side with respect to the bracket 11 on the vehicle side; for example, is kept at 1 mm or less. Therefore, even though a moment is applied to the bracket 12b on the column side as a result of attempting to rotate the steering wheel 1 in the locked state of the steering lock apparatus, the amount of relative displacement between the bracket 12b on the column side and the bracket 11 on the vehicle side is kept to a small amount. As a result, a force strong enough to damage the bracket 12b on the column side or the locking capsule 57 is not applied to these members 12b, 57.

In this embodiment, the location of the protruding sections 63 is on the edges of the front ends of the support plate sections 41, or in other words, further toward the front side than the locking capsule 57, however, the location is not limited to this, and they could be located further toward the rear side than the locking capsule 57, or protruding sections could even be formed off to the sides of the locking capsule 57. For example, at a location further toward the rear than the locking capsule 57, it is possible to form protruding sections that protrude toward the outside in the width direction by bending from the top sections of the rear edges of the pair of left and right supporting plate sections 41 at nearly right angles, and cause the top end surfaces of part of the top edges of these protruding sections to closely face the bottom end surface of part of the bottom edge of the bent section 56. Alternatively, when bending the protruding sections that protrude outward in the width direction from the top sections in the middle sections in the forward/backward direction of the pair of left and right support plate sections at nearly right angles on both sides in the width direction of the locking capsule 57, or when forming an integrated bracket 12d on the column side by pressing these protruding sections such that they protrude at nearly right angles, it is possible to cause the top end surfaces of part of the top edges of these protruding sections to closely face the bottom end surfaces of part of the bottom edges of the bent section 56, or to cause the top end surfaces of part of the top edges of these protruding sections to closely face the bottom surface of the installation plate section 52.

In the steering apparatus for an automobile of this embodiment, by having the bracket 11 on the vehicle side and the locking capsule 57 engage at only the center section in the width direction of the bracket 11 on the vehicle side, it is possible to simplify tuning for stabilizing the forward displacement of the steering wheel 1 during a secondary collision. A single locking capsule 57 is located in the portion directly above the outer column 30 in this way, so an impact load that is transmitted to the locking capsule 57 from the steering wheel 1 by way of the outer shaft 31 and outer column 30 during a secondary collision is applied nearly uniformly to the locking pins 60 that connect the locking capsule 57 and the bracket 11 on the vehicle side. That is, the impact load essentially acts on the center section of the locking capsule 57 in the axial direction of the outer column 30. A force is applied in the direction that causes this single locking capsule 57 to come out in the forward direction from the locking hole 40. The locking pins 60 that join together the locking capsule 57 and the bracket 11 on the vehicle side essentially shear at the same time. As a result, displacement in the forward direction of the outer column 30 that is connected to the locking capsule 57 by way of the bracket 12b on the column side is performed stably without the center axis tilting excessively. There is a space 64 between the top edges of the protruding sections 63 and the bottom surface of the bracket 11 on the vehicle side, so these protruding sections 63 do not hinder the forward displacement of the steering wheel 1 during a secondary collision.

Particularly, in the case of this embodiment, a friction plate unit 51 for increasing the support force for holding the steering wheel 1 at an adjusted position is provided together with a tilting and telescopic mechanism for adjusting the up/down position and forward/backward position of the steering wheel 1. Providing the tilting and telescopic mechanism and the friction plate unit 51 are a cause for making it easy for large variation to occur in the break away load during a secondary collision due to an accumulation of manufacturing errors, however in this embodiment, through the engagement between the single locking capsule 57 and the bracket 11 on the vehicle side, variation in the break away load is suppressed. As a result, tuning for lessening the impact that is applied to the body of the driver that collides with the steering wheel 1 during a secondary collision is performed properly, and it becomes easier to more completely protect the driver. Moreover, an energy absorbing member that plastically deforms and absorbs impact energy due to displacement in the forward direction is provided between a portion that does not displace during a secondary collision, for example the bracket 11 on the vehicle side, and the portion that displaces in the forward direction due to a secondary collision, for example, the outer column 30. This energy absorbing member is also positioned in the center section in the width direction of the outer column 30 and effectively deforms plastically due to displacement in the forward direction of the outer column 30. Various known forms of this kind of energy absorbing member are disclosed (refer to JP2000-6821), however, because it is not related to the gist of the present invention, detailed drawings and an explanation are omitted.

Furthermore, preventing damage to the bracket 12b on the column side and the locking capsule 57 is achieved by causing the top edges of the left and right protruding sections 63 that are formed on the side of this bracket 12b on the column side to closely face the edge on the bottom end of the bent section 56 of the bracket 11 on the vehicle side. In other words, by causing these edges to closely face each other, sloping of the bracket 12b on the column side is suppressed. Therefore, in construction that comprises a steering lock apparatus, even when an attempt is made to rotate the steering wheel 1 with a strong force when the steering lock apparatus is functioning, the bracket 12b on the column side and the locking capsule 57 do not deform much, and thus it is possible to prevent damage to these members 12b, 57. It is also possible to prevent displacement in the forward direction of the outer column 30 from being hindered during a secondary collision, or in other words, prevent displacement from not being performed smoothly during a secondary collision due to damage to these members 12b, 57.

Moreover, the top surfaces of both end sections in the width direction of the installation plate section 52 of the bracket 11 on the vehicle side are on the same plane, and these top surfaces of both end sections in the width direction are brought in contact with the installation surface 53 that is formed on the vehicle side, so it is possible to reduce the costs by simplifying the work of processing parts, the management of parts and assembly work, and to maintain the freedom of design by reducing the assembly height. In other words, with this construction, it is essentially possible to directly connect and fasten the bracket 11 on the vehicle side to the vehicle body, so a member such as the connection bracket is not needed, and thus it is possible to reduce costs and maintain design freedom. Moreover, the planar shape of the installation plate section 52 is pot shaped, and by forming a bent section 56 on the outer edge of the installation plate section 52 except for the edge on the front end, it is possible to sufficiently maintain the bending rigidity of the bracket 11 on the vehicle side that includes this installation plate section 52. Therefore, even when the top surfaces of both end sections in the width direction of the installation plate section 52 are on the same plane as each other, it is possible to maintain the rigidity of the bracket 11 on the vehicle side, and to suppress vibration of the steering column 6d and the like that are supported by the vehicle body by way of this bracket 11 on the vehicle side. As a result, it is possible to prevent making the driver who operates the steering wheel 1 that is supported by the steering column 6d via the steering shaft 5c uncomfortable.

Furthermore, preventing excessive downward displacement of the steering wheel 1 even when a secondary collision has advanced is achieved by making the length $L_{40}$ in the forward/backward direction of the locking hole 40 sufficiently longer than the length $L_{57}$ in the forward/backward direction of the locking capsule 57. In other words, these lengths $L_{40}$, $L_{57}$ are regulated in this way, so even when the secondary collision advances and the locking capsule 57 has completely displaced in the forward direction, not all of the locking capsule 57 comes out in the forward direction from the locking hole 40. Therefore, even when the secondary collision has advanced, it is possible to maintain the support force of the outer column 30, and to prevent the steering wheel 1 that is supported by the outer column 30 via the outer shaft 31 from excessive displacement downward. Moreover, depending on the extent of the accident, it is possible to operate the steering wheel even after a secondary collision, and thus it becomes easier to handle the vehicle that was involved in the accident, such as when moving the vehicle to the side of the road.

In the case of the steering apparatus for an automobile of this embodiment, the bracket 11 on the vehicle side and the locking capsule 57 engage at only the center section in the width direction of the bracket 11 on the fastening side, so it is possible to reduce the load for causing the steering wheel 1 to displace in the forward direction during a secondary collision, however, in order to further improve the protection of the driver during a secondary collision, it is preferred that this load be reduced even more. In order to reduce this load even more, preferably the number of locking pins 60 that connect the bracket 11 on the vehicle side and the locking capsule 57 is kept to a minimum. However, when the number of these locking pins 60 is reduced, the stress applied to these locking pins 60 increases due to a moment that is applied to the bracket 12b on the column side when the driver carelessly rotates the steering wheel 1 when getting in or out of the vehicle when the steering lock apparatus is locked, or in other words, the moment that each of these locking pins 60 must support increases, and it becomes easy for these locking pins 60 to undergo strain. When strain occurs, vibration occurs in the support section of the steering wheel 1, giving a feeling of discomfort to the driver operating the steering wheel 1. However, in the construction of this embodiment, relative displacement between the bracket 11 on the vehicle side and the locking capsule 57 is kept small, and thus strain of the locking pins 60 can be suppressed. Particularly, in the case of a tilting and telescopic steering apparatus, such as in this embodiment, the height dimension of the steering column support is high, and it becomes easy for a moment such as described above to occur when getting in or out of the vehicle, so the protruding sections 63 are very effective in suppressing the amount of relative displacement between the bracket 11 on the vehicle side and the locking capsule 57.

Next, the construction illustrated in FIG. 5B will be explained. In the construction illustrated in FIG. 5A, the shape of the locking capsule 57 is simple, and in addition to being able to keep down the manufacturing costs of the locking capsule 57, it is possible to keep the assembly height of the portion where the locking capsule is installed low. This kind of construction makes it possible to lower costs of the steering apparatus for an automobile and make the steering apparatus more compact and lightweight, and by shortening the distance between the center axis of the outer column 30, which is where the impact load acts, and the engagement section between the bracket 11 on the vehicle side and the locking capsule 57, which is the section that breaks away during a secondary collision, keeping the difference in these heights small, torsion that occurs as this distance becomes long can be suppressed, and thus it is possible to stabilize the break away load of this engagement section even more.

However, the construction illustrated in FIG. 5B is advantageous from the aspect of simplifying the injection molding of the locking pins. In other words, in the case of the construction illustrated in FIG. 5A, when performing injection molding of the locking pins 60, it is necessary to perform injection molding with the bracket 11 on the vehicle side, the locking capsule 57 and the bracket 12b on the column side connected. However, in the case of the construction illustrated in FIG. 5B, only the bracket 11 on the vehicle side and the locking capsule 57a need to be set in the die for injection molding of the locking pins 60, so the die can easily be made more compact. In other words, the locking capsule 57a has locking grooves 65 that are formed on both the left and right side surfaces, and the edges on both sides of the locking hole 40 of the bracket 11 on the vehicle side engage with these locking grooves 65. Therefore, after the bracket 11 on the vehicle side is connected with the locking capsule 57a by the locking pins 60, the locking capsule 57a can be connected and fastened to the bracket 12b on the column side by the bolts 61 and nuts 62.

Embodiment 2

Figure 6:
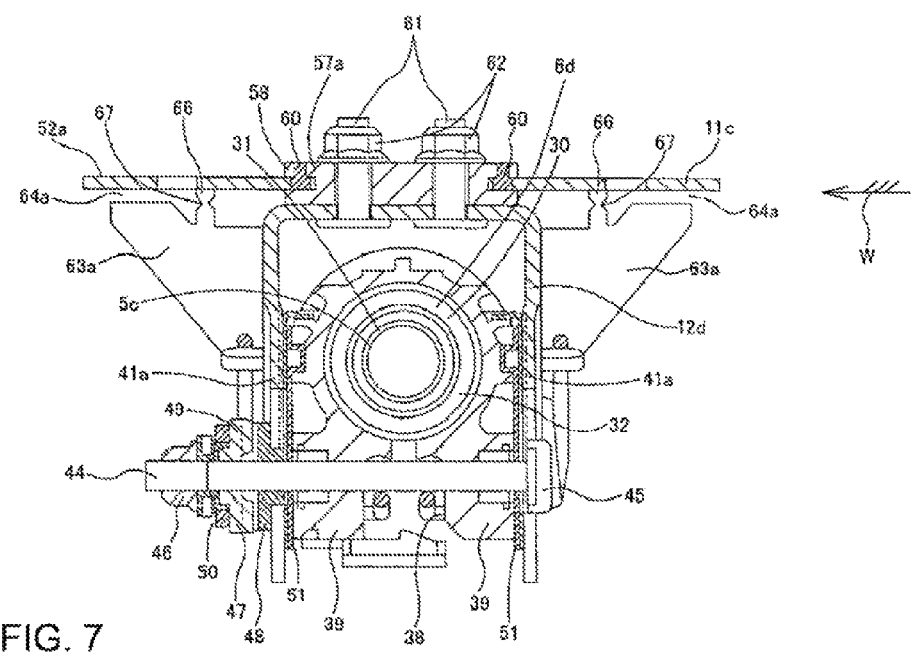
FIG. 6 illustrates a second embodiment of the present invention, and is a cross-sectional view of a virtual plane that exists in a direction orthogonal to the center axis of the steering column.
Figure 7:
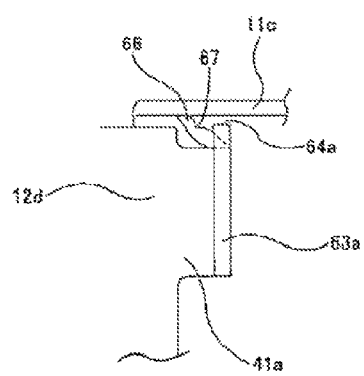
FIG. 7 is a view as seen from the direction of arrow W in FIG. 6.
Figure 8:
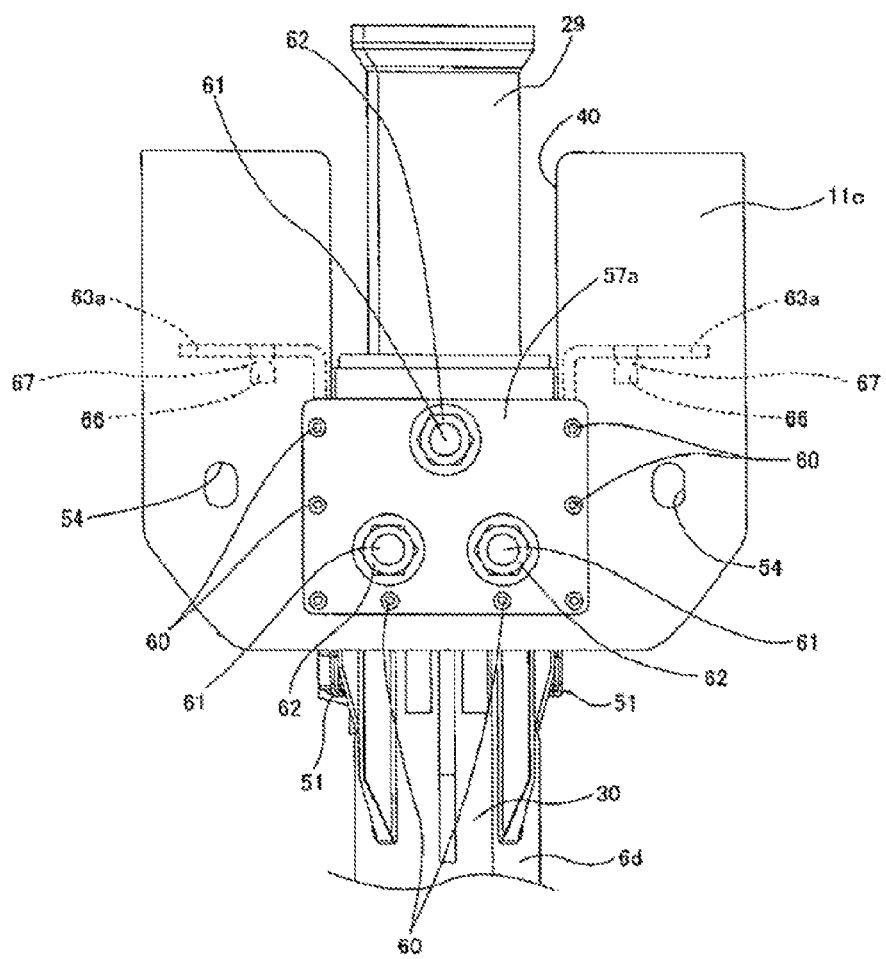
FIG. 8 illustrates the second embodiment, and is a top view that illustrates the state as seen from above in FIG. 6.

FIGS. 6 to 8 illustrate a second embodiment of the present invention. The feature of the construction and function of the construction of this embodiment is that, presuming construction in which displacement (breaking away) in the forward direction of the center section in the width direction of the bracket 11c on the vehicle side and the center section in the width direction of the bracket 12d on the column side due to an impact load that is applied during a secondary collision is made possible by a single locking capsule 57a, the rigidity against a moment around the center axis is improved. The construction and function of the portion where the center sections in the width direction of the bracket 11 on the vehicle side and the bracket 12d on the column side are connected by a single locking capsule 57a is basically the same as the conventional construction or the construction of the first embodiment, so an explanation of identical parts is either omitted or simplified, such that the following explanation centers on the feature of this embodiment.

A pair of left and right protruding sections 63a is formed by bending the portions that protrude forward from the upper half section of the edges on the front end of the pair of left and right support plate sections 41a of the bracket 12d on the column side 90 degrees toward opposites sides (outward in the width direction) from each other. The top edges of the tip end sections (end sections on both the left and right) of these protruding sections 63a are caused to closely face the bottom surface of the bracket 11c on the vehicle side. This point is basically the same as in the first embodiment, however, in the case of this embodiment, the top edges of the tip end sections of the protruding sections 63 are caused to closely face through a space 64a part of the bottom surface of the main portion (installation plate section 52 itself) instead of part of the bottom edge of the bent section 56 of the bracket 11c on the vehicle side. A bent section is not particularly formed around the outer edge of the bracket 11c on the vehicle side, however, a bent section can be formed as long as it does not interfere with the protruding sections 63a or protruding support sections 66, and does not hinder forward displacement of the bracket 12d on the column side during a secondary collision.

Protruding support sections 66 are formed in the portions of the top edges of the protruding sections 63a that are a little nearer the center of the bracket 12d on the column side than the portions that closely face the bottom surface of the bracket 11c on the vehicle side, or in other words, in the center sections in the width direction of the protruding sections 63a. These protruding support sections 66 are formed by bending from the top edges of the protruding sections 63a diagonally toward the rear so that they protrude upward toward the rear from the top edges of the protruding sections 63a. The top end sections of these protruding support sections 66 are caused to come into elastic contact with part of the bottom surface of the bracket 11c on the vehicle side.

In the case of this embodiment, narrow sections 67 are formed in the middle sections of the protruding support sections 66, and they keep the contact pressure at the areas of contact between the top end sections of the protruding support sections 66 and the bottom surface of the bracket 11c on the vehicle side proper. In addition to forming these narrow sections 67 in order to make that moment rigidity of the bracket 12d on the column side proper by regulating the contact pressure at the areas of contact, it is possible to change the thickness dimension, width dimension and inclination angle of the protruding support sections 66. For example, the greater the thickness dimension and the width dimension is, the higher the contact pressure becomes and the rigidity improves. Moreover, in regards to the inclination angle, the greater the crossing angle with the bottom surface of the bracket 11c on the vehicle side is, the higher the contact pressure is, and the rigidity is improved. In other words, when the entire length of the protruding sections is lengthened and the crossing angle between these protruding sections and the bottom surface of the bracket 11c on the vehicle side is decreased, the contact pressure is decreased and the rigidity is kept low.

With the construction of this embodiment, in addition to the effect of the first embodiment, it is possible to further suppress vibration of the bracket 12d on the column side with respect to the bracket 11c on the vehicle side when travelling over a bad road. In other words, the protruding support sections 66 function as resistance to relative displacement between the both the left and right end sections of the brackets 12d, 11c around the center axis of the steering column 6d. Therefore, in the case where a moment on the level of a vibration is applied when travelling over a bad road, it is possible to prevent displacement of the bracket 12d on the column side with respect to the bracket 11c on the vehicle side. It is also possible to prevent vibration of the steering wheel 1 that is supported by the bracket 12 on the column side by way of the steering column 6d and the steering shaft 5c, and thus it is possible to prevent giving discomfort to the driver who operates the steering wheel 1. Furthermore, when a large moment is applied between the bracket 11c on the vehicle side and the bracket 12d on the column side as a result of attempting to rotate the steering wheel 1 when the steering lock apparatus is locked, the protruding support section 66 on the front side of the direction where this moment acts elastically deflects, and on the outside of the protruding support section 66, the top edge of the protruding section 63a comes in contact with the bottom surface of the bracket 11c on the vehicle side. As a result, there is no further displacement of the bracket 12d on the column side with respect to the bracket 11c on the vehicle side, and thus in addition to being able to prevent damage to these brackets 12d, 11c and the locking capsule 57a, it is possible to prevent excessive elastic deformation of the protruding support section 66.

The protruding sections 63a and protruding support sections 66 that are formed on the bracket 12d on the column side displace in the forward direction with respect to the bracket 11c on the vehicle side during a secondary collision. When this happens, the top end sections of the protruding support sections 66 slide over the bottom surface of the bracket 11c on the vehicle side. In the case of the construction of this embodiment, these protruding support sections 66 are angled in a direction upward toward the rear, so when the bracket 12d on the column side displaces in the forward direction due to a secondary collision, the force on the protruding support sections 66 does not become large, and these protruding support sections 66 do not hinder the forward displacement of the bracket 12d on the column side.

The construction of the protruding sections is not limited to the construction of the protruding support sections 66 that protrude from the top end of the protruding sections 63a that are formed on the bracket 12d on the column side described above. As long as the construction of these protruding sections does not hinder displacement of the locking capsule 57, 57a in the forward direction, any construction between the portions on both the left and right sides of the bracket on the column side and the portions on both the left and right sides of the bracket on the vehicle side in which protruding sections protrude from one of these brackets toward the other bracket can be employed. For example, it is possible to use protruding sections that are formed by bending and stretching or by pressing part of the top surface of the bracket 12d on the column side toward the bottom surface of the bracket 11c on the vehicle side. Similarly, it is possible to form protruding sections on the bottom surface of the bracket 11c on the vehicle side that extend toward the top surface of the bracket 12d on the column side. Furthermore, by placing a shock absorbing material, such as an elastic material, between both of these surfaces, a similar effect can be obtained.

Embodiment 3

Figure 9:
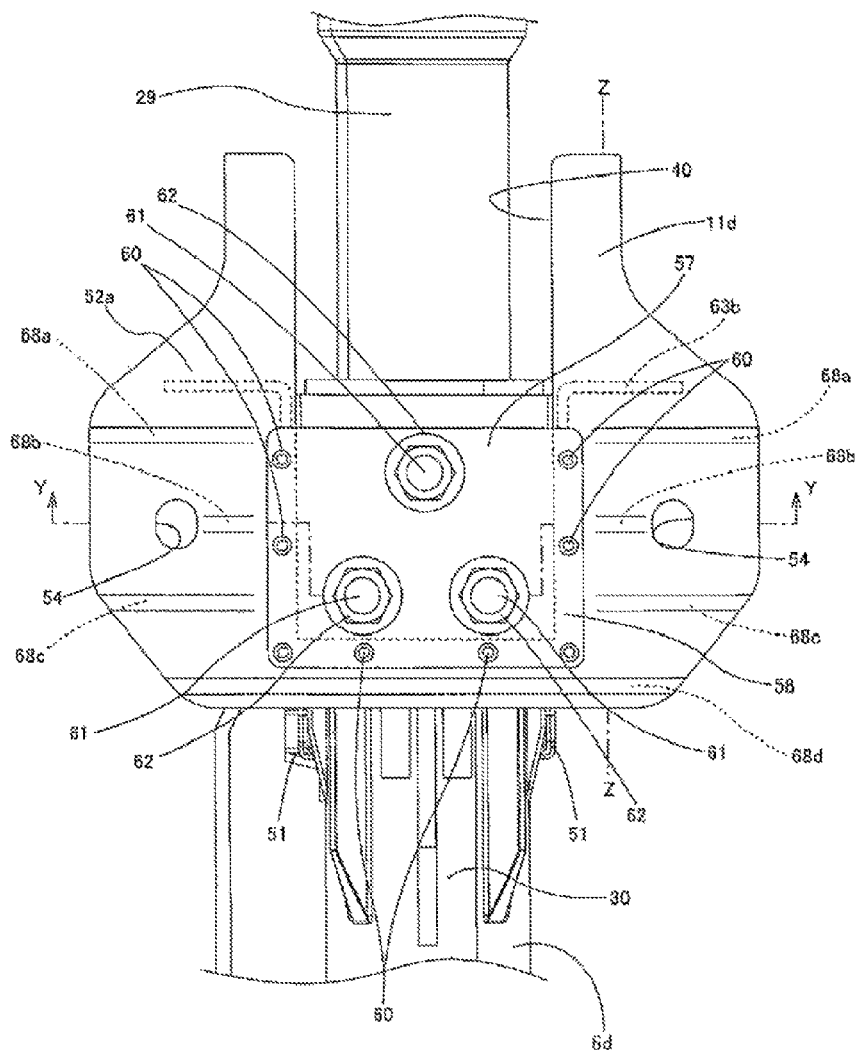
FIG. 9 illustrates a third embodiment of the present invention, and is a view similar to that of FIG. 3.
Figure 10:
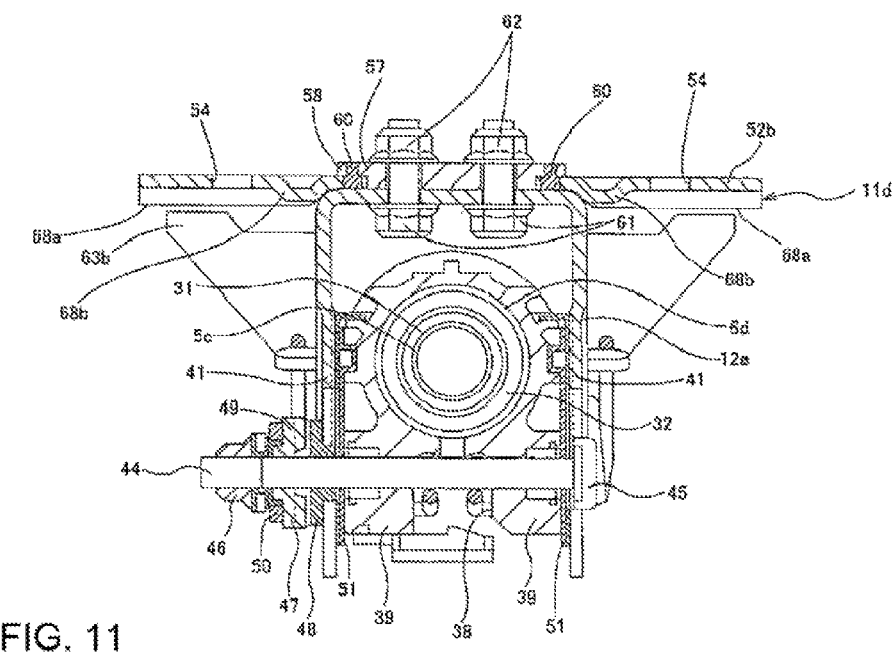
FIG. 10 is a cross-sectional view of section Y-Y in FIG. 9.
Figure 11:
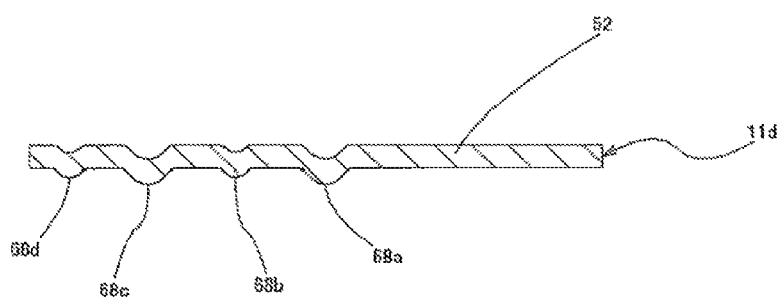
FIG. 11 is a cross-sectional view of section Z-Z in FIG. 9.

FIGS. 9 to 11 illustrate a third embodiment of the present invention. In the case of this embodiment as well, a bent section 56 as in the first embodiment is not formed around the edge of the bracket 11d on the vehicle side. Instead of this, in this embodiment, ribs 68a to 68d that protrude downward are formed at a plurality of locations in the forward/backward direction of the installation plate section 52b of the bracket 11d on the vehicle side. In other words, a pair of ribs 68a are formed in the portions in the middle section in the forward/backward direction of the installation plate section 52b on both the left and right sides of the front end section of the locking capsule 57 in the normal state (state in which a secondary collision has not occurred). The outside end sections of these ribs 68a in the width direction of the installation plate section 52b extend to the edges of both sides of the installation plate section 52b. On the other hand, the inside end sections of these ribs 68a, in order that they do not hinder displacement in the forward direction of the locking capsule 57 during a secondary collision, do not extend to the edges of the locking hole (notch) 40, but end part way.

A pair of short ribs 68b is formed in the portions between the middle section in the forward/backward direction of the locking capsule 57 and the installation holes 54. The inside end sections of these ribs 68b, for the same reason as above, do not extend to the edges on the sides of the locking hole 40, but end part way. On the other hand, the outside end sections also do not extend to the installation holes 54, but end part way, in order that the head sections of the bolts or the nuts can come in contact with the portions around the installation holes 49 directly or by way of a seat plate.

A pair of ribs 68c are formed in the portions near the rear end of the installation plate section 52b in the portions on both the left and right sides of the portion near the rear end of the middle section of the locking capsule 57 in the normal state. The characteristics of these ribs 68c are the same as the ribs 68a in the very front.

Furthermore, one rib 68d is formed in the rear end section of the installation plate section 52b in the portion that protrudes further toward the rear than the locking capsule 57. Both end sections of this rib 68d extend to the edges on both ends of the installation plate section 52b.

With the construction of this embodiment, as in the case of the first embodiment, the top surface of the bracket 11d on the vehicle side is flat, making it possible to maintain good installation characteristics for installation to the installation surface 48 that is formed on the vehicle side. The bending rigidity of the rear half section of the bracket 11d on the vehicle side that locks with the locking capsule that connects this bracket 11d on the vehicle side and the steering column 6d is high. Therefore, as in the first embodiment it is possible to both reduce costs through simplification of the work of processing parts, managing parts and assembling parts, and maintain design freedom by keeping the assembly height small.

Except for changing the shape of the bracket 11d on the vehicle side and accordingly changing the shape of the protruding sections 63, the construction and functions are the same as in the case of the first embodiment, so drawings and explanations of identical parts are omitted.

Regardless of a moment applied to the bracket on the column side, in order that no large force is applied to the connecting section between the bracket on the column side and the bracket on the vehicle side, a pair of hanging plate sections could also be formed in the portions on both the left and right sides of the bracket on the vehicle side. In other words, these hanging plate sections are formed below the portions near both the left and right ends of the bracket on the vehicle side by bending downward part of the metal plate of the bracket on the vehicle side at a right angle or near right angle with respect to the top plate section (installation plate section in which installation holes are formed for fastening to the vehicle body) of the bracket on the vehicle side. By causing the inside edges of these hanging plate sections to closely face the outside surfaces of the pair of support plate sections of the bracket on the column side, it is possible to prevent a large force from being applied to the connecting section between this bracket on the column side and the bracket on the vehicle side regardless of a moment that is applied to the bracket on the column side.

INDUSTRIAL APPLICABILITY

The case of applying the present invention to a steering column support apparatus that comprises both a tilt mechanism for adjusting the up/down position of a steering wheel, and a telescopic mechanism for similarly adjusting the forward/backward position of the steering wheel was explained. However, the present invention can also be applied to a steering column support apparatus that comprises only a tilt mechanism or only a telescopic mechanism, and can be applied to a fixed steering wheel type steering column support apparatus that does not comprise either of these mechanisms.

EXPLANATION OF THE REFERENCE NUMBERS

1 Steering wheel
2 Steering gear unit
3 Input shaft
4 Tie rod
5, 5a, 5b, 5c Steering shaft
6, 6a, 6b, 6c, 6d Steering column
7 Universal joint
8 Intermediate shaft
9 Universal joint
10, 10a Housing
11, 11', 11a, 11b, 11c, 11d Bracket on the vehicle side
12, 12a, 12b, 12c, 12d, 12e Bracket on the column side
13 Bracket on the housing side
14a, 14b Installation plate section
15a, 15b Notch 16a, 16b Sliding plate
17 Energy absorbing member
18, 18a Electric motor
19 Locking hole
20 Locking capsule
21 Locking groove
22a, 22b Small locking hole
23 Locking pin
24 Seat plate
25 Connecting bracket
26 Key lock pin
27 Key lock collar
28 Key lock hole
29 Inner column
30 Outer column
31 Outer shaft
32 Ball bearing
33 Controller
34 Support cylinder (Rocking support bracket)
35 Installation hole
36 Support cylinder
37 Center hole
38 Slit
39 Supported plate section
40 Locking hole
41, 41a Support plate section
42 Long hole in the up/down direction
43 Long hole in the forward/backward direction
44 Adjustment rod
45 Head section
46 Nut
47 Driving cam
48 Driven cam
49 Cam apparatus
50 Adjustment lever
51 Friction plate section
52, 52a, 52b Installation plate section
53 Installation surface
54 Installation hole
55 Concave section
56 Bent section
57, 57', 57a Locking capsule
58 Flange section
59a, 59b Small through hole
60 Locking pin
61 Bolt
62 Nut
63, 63a, 63b Protruding section
64, 64a Space
65 Locking groove
66 Protruding support section
67 Narrow section
68a, 68b Rib
69 Low friction material

What is claimed is:

1. A steering apparatus for an automobile comprising:
   a steering column;
   a steering shaft that is supported on the inside of the steering column such that the steering shaft can rotate freely, with a steering wheel being fastened to and supported by the rear end section of the steering shaft that protrudes toward the rear from the rear end section of the steering column;
   a bracket on the vehicle side that comprises a locking hole that is located in the center section in the width direction of the bracket and extends in the axial direction of the steering column, the bracket being fastened to and supported by a vehicle body such that the bracket does not displace in the forward direction during a secondary collision;
   a bracket on the column side that is supported by the steering column and that displaces in the forward direction together with the steering column during the secondary collision; and
   a locking capsule that is fastened to the bracket on the column side, and together with both end sections being locked in the locking hole, both sides on the top end are located on the top side of the bracket on the vehicle side in the portions on both sides of the locking hole,
   by positioning part of the locking capsule positioned on the inside of locking hole, and connecting this locking capsule and the bracket on the vehicle side, the bracket on the column side being supported by the bracket on the vehicle side such that the bracket on the column side can break away in the forward direction by an impact load that is applied during the secondary collision,
   the steering apparatus further comprising:
   a pair of left and right protruding sections in part of the bracket on the column side that protrude further outward in the width direction than the surfaces on the left and right sides of the bracket on the column side, where part of the top edges of these protruding sections are caused to closely face through a small space part of the bottom surface of the bracket on the vehicle side;
   or alternatively further comprising:
   a pair of left and right protruding support sections between the portions on both the left and right sides of the bracket on the column side and both the left and right sides of the bracket on the vehicle side in a state where these protruding support sections protrude from one of the brackets toward the other bracket, with the tip end sections of these protruding support sections coming in contact with the other bracket with a contact pressure that allows sliding in the forward direction due to an impact load of the secondary collision.

2. The steering apparatus for the automobile according to claim 1, wherein the locking capsule and the bracket on the vehicle side are connected by a connecting member that shears due to an impact load that is applied during the secondary collision.

3. The steering apparatus for the automobile according to claim 1, wherein the steering apparatus comprises both the protruding sections and the protruding support sections.

4. The steering apparatus for the automobile according to claim 3, wherein the protruding support sections are formed such that these protruding support sections protrude upward toward the rear from the top edges of the protruding sections, with the top end sections of these protruding support sections coming in elastic contact with part of the bottom surface of the bracket on the vehicle side.

5. The steering apparatus for the automobile according to claim 1, further comprising a steering lock apparatus that prevents rotation of the steering shaft inside the steering column according to operation of an ignition key in a direction that stops an engine of the automobile.

6. The steering apparatus for the automobile according to claim 2, wherein
   the locking capsule comprises a lower half section having a width dimension that is equal to or less than the width dimension of the locking hole, and an upper half section having a width dimension that is greater than the width dimension of the locking hole and flange sections on both end sections in the width direction that protrude further to both sides in the width direction than the surfaces on both sides in the width direction of the lower half section;

small through holes are formed in the flange sections and in part of the bracket on the vehicle side in portions on both sides of the locking hole in positions that are aligned with each other; and with the bottom surface of the locking capsule in contact with the top surface of the bracket on the vehicle side, and portions of part of the bracket on the vehicle side on both sides of the locking hole are held between the bottom surface of the flange sections and the top surface of the bracket on the column side, connecting members span between the small through holes that are formed in the flange sections and the small through holes that are formed in part of the bracket on the vehicle side.

7. The steering apparatus for the automobile according to claim 6, wherein the connecting members are synthetic resin connecting pins that are formed by injection molding of injecting molten resin into the small through holes, where part of the synthetic resin that forms these locking pins penetrates in between the bottom surface of the bracket on the vehicle side and the top surface of the bracket on the column side, and between the top surface of the bracket on the vehicle side and the bottom surfaces of the flange sections, with this synthetic resin preventing vibration due to the space between these surfaces.

8. The steering apparatus for the automobile according to claim 1 wherein the length in the forward/backward direction of the locking hole is greater than the length in the forward/backward direction of the locking capsule, with the length of the locking capsule being just long enough that even when the locking capsule has displaced in the forward direction together with the steering column due to the secondary collision, at least part of the locking capsule is positioned on the top side of the front end section of the bracket on the vehicle side, preventing the locking capsule from dropping down.

\* \* \* \* \*